(12) United States Patent
Kura et al.

(10) Patent No.: US 8,178,641 B2
(45) Date of Patent: May 15, 2012

(54) AMINO GROUP-CONTAINING CONJUGATED DIENE POLYMER AND METHOD FOR PRODUCING THE SAME, AND BLOCK COPOLYMER AND METHOD FOR PRODUCING THE SAME

(75) Inventors: Satoshi Kura, Tokyo (JP); Toshiyuki Hayakawa, Tokyo (JP); Kazuhiro Iso, Tokyo (JP); Susumu Komiyama, Tokyo (JP)

(73) Assignee: JSR Corporation, Tokyo (JP)

( * ) Notice: Subject to any disclaimer, the term of this patent is extended or adjusted under 35 U.S.C. 154(b) by 148 days.

(21) Appl. No.: 12/740,952

(22) PCT Filed: Oct. 1, 2008

(86) PCT No.: PCT/JP2008/067836
§ 371 (c)(1),
(2), (4) Date: Jul. 6, 2010

(87) PCT Pub. No.: WO2009/057412
PCT Pub. Date: May 7, 2009

(65) Prior Publication Data
US 2010/0267918 A1    Oct. 21, 2010

(30) Foreign Application Priority Data

Oct. 30, 2007 (JP) .................. 2007-281381
Nov. 1, 2007 (JP) .................. 2007-284732
Mar. 27, 2008 (JP) .................. 2008-083908

(51) Int. Cl.
C08G 81/00 (2006.01)
C08G 77/26 (2006.01)
C08G 73/00 (2006.01)
C08G 63/00 (2006.01)

(52) U.S. Cl. ............. 528/20; 528/25; 528/328; 528/392

(58) Field of Classification Search .................. None
See application file for complete search history.

(56) References Cited

U.S. PATENT DOCUMENTS

| | | | | |
|---|---|---|---|---|
| 4,172,100 A | * | 10/1979 | Tung et al. | 585/25 |
| 4,172,190 A | | 10/1979 | Tung et al. | |
| 4,196,154 A | * | 4/1980 | Tung et al. | 260/665 R |
| 4,205,016 A | * | 5/1980 | Tung et al. | 260/665 R |
| 4,822,530 A | | 4/1989 | Bronstert et al. | |
| 4,960,842 A | * | 10/1990 | Lo et al. | 526/175 |
| 6,562,923 B1 | * | 5/2003 | Robert et al. | 526/173 |
| 2004/0254301 A1 | | 12/2004 | Tsukimawashi et al. | |
| 2007/0149744 A1 | * | 6/2007 | Yan et al. | 528/38 |

FOREIGN PATENT DOCUMENTS

| | | |
|---|---|---|
| JP | 55 5773 | 1/1980 |
| JP | 58 136623 | 8/1983 |
| JP | 62 116606 | 5/1987 |
| JP | 63 265902 | 11/1988 |
| JP | 5 317403 | 12/1993 |
| JP | 7 80057 | 3/1995 |
| JP | 2003 171418 | 6/2003 |
| WO | 93 23453 | 11/1993 |

OTHER PUBLICATIONS

Tung et al. "Dilithium Anionic Initiators Based on Double 1,1-Diphenylethylene Compounds" Macromolecules, 1978, 11, 617-618.*

Hattori, I. et al., "Synthesis of Polymers With Primary Amino End Groups, $2^{a)}$ Synthesis of Polyisoprene With Primary Amino End Groups and Ploy(isoprene-b-γ-benzyl-L-glutamate)s", Makromol. Chem., vol. 184, No. 7, pp. 1355-1362 (Jul. 1983).

* cited by examiner

*Primary Examiner* — Robert S Loewe
(74) *Attorney, Agent, or Firm* — Oblon, Spivak, McClelland, Maier & Neustadt, L.L.P.

(57) ABSTRACT

A method for producing an amino group-containing conjugated diene polymer includes polymerizing a conjugated diene compound in the presence of a reaction product of 1,3-bis(diphenylethenyl)benzene or a derivative thereof and an organolithium compound to obtain a conjugated diene polymer, and reacting the conjugated diene polymer with a modifier.

20 Claims, No Drawings

AMINO GROUP-CONTAINING CONJUGATED DIENE POLYMER AND METHOD FOR PRODUCING THE SAME, AND BLOCK COPOLYMER AND METHOD FOR PRODUCING THE SAME

TECHNICAL FIELD

The present invention relates to an amino group-containing conjugated diene polymer, a method for producing the same, a block copolymer, and a method for producing the same.

BACKGROUND ART

An A-B-A block copolymer that includes an amino acid block (A) that contains a polyamino acid and exhibits excellent biocompatibility, and a conjugated diene block (B) that contains a polydiene and improves physical properties (e.g., elongation at break) is known as a resin that may be used as a medical material and the like (see Patent Documents 1 and 2, for example).

Patent Documents 1 and 3 disclose a method for producing an A-B-A block copolymer that includes a polyamino acid block and a polyisoprene block. Specifically, a polyisoprene derivative that includes an amino group at each end is reacted with an amino acid-N-carboxy anhydride (e.g., γ-benzyl L-glutamate N-carboxyamino acid anhydride (BLG-NCA)) to expand each amino end of the polyisoprene derivative as a polyamino acid block. It is required that phosgene must be used as an initiator when synthesizing the amino acid-N-carboxy anhydride.

A polyisoprene derivative that includes an amino group at each end and is used as the raw material for such an A-B-A block copolymer may be produced by reacting a modifier (coupling agent) such as an anionic reactive compound (e.g., 2,2,5,5-tetramethyl-(3-bromopropyl)-aza-2,5-disilacyclopentane) that includes a protected amino group with the polymerization end of polyisoprene, and deprotecting the resulting product (see Patent Document 2, for example). Patent Document 2 discloses that the polyisoprene block can be produced by anionic polymerization using a difunctional anionic initiator obtained by reacting an alkyllithium with an aromatic hydrocarbon that includes two functional groups (e.g., 1,3-diisopropenylbenzene (DIPB)).

The reaction using the above coupling agent has a problem in that the amino group introduction rate (modification rate) of the end of polyisoprene is as low as 20 to 30%. Non-patent Document 1 discloses that an amino group can be introduced into the end of an isoprene block at an average introduction rate (modification rate) of about 90% by utilizing an imine compound such as N-(trimethylsilyl)benzaldimine as the modifier for introducing an amino group into the end of polyisoprene.

Patent Document 1: JP-A-5-317403
Patent Document 2: JP-A-7-80057
Patent Document 3: WO93/23453
Non-patent Document 1: Iwakazu Hattori et al., Makromol. Chem., 184, pp. 1355-1362 (1983)

DISCLOSURE OF THE INVENTION

According to anionic polymerization using a difunctional anionic initiator obtained by reacting an alkyllithium with DIPB disclosed in Patent Document 2, the resulting polyisoprene block does not necessarily have a narrow molecular weight distribution. Moreover, it may be difficult to sufficiently improve the primary amino group introduction rate (modification rate) of the isoprene block when using the above modifier.

The above imine compound is very unstable to oxygen and water, and has poor handling capability. Moreover, the above imine compound is expensive, and increases cost when used as the modifier. The inventors of the present invention found a silane coupling agent represented by N,N-bis(trimethylsilyl)aminopropyldimethylmethoxysilane as an inexpensive modifier. However, when using N,N-bis(trimethylsilyl)aminopropyldimethylmethoxysilane as a modifier for polyisoprene produced by a known method, the average amino group introduction rate (modification rate) of the end of the isoprene block is about 80%, which is not sufficient for a material used to produce an A-B-A block copolymer (see Comparative Example 4 for details).

On the other hand, phosgene that is used as an initiator when synthesizing an amino acid-N-carboxy anhydride is a highly toxic compound, and requires careful handling from viewpoint of environmental protection, safety, and the like. Therefore, a method for producing a block copolymer that includes a polyamino acid block and a polyisoprene block using an amino acid-N-carboxy anhydride synthesized using phosgene is desired to be improved.

The present invention was conceived in view of the above problems. An object of the present invention is to provide a method for producing an amino group-containing conjugated diene polymer that can produce an amino group-containing conjugated diene polymer having a narrow molecular weight distribution and a high modification rate (primary amino group introduction rate).

Another object of the present invention is to provide a method for producing a block copolymer that can safely produce an A-B-A block copolymer that includes an amino acid block (A) and a conjugated diene block (B) and exhibits excellent tensile strength and elongation in high yield without using phosgene.

Still another object of the present invention is to provide an amino group-containing conjugated diene polymer having a narrow molecular weight distribution and a high modification rate (primary amino group introduction rate).

A further object of the present invention is to provide an A-B-A block copolymer that includes an amino acid block (A) and a conjugated diene block (B) and exhibits excellent tensile strength and elongation.

The inventors conducted extensive studies in order to achieve the above objects. As a result, the inventors found that the above objects can be achieved by utilizing a specific difunctional anionic initiator and a specific modifier. This finding has led to completion of the present invention.

Specifically, the present invention provides a method for producing an amino group-containing conjugated diene polymer, a method for producing a block copolymer, an amino group-containing conjugated diene polymer, and a block copolymer given below.

[1] A method for producing an amino group-containing conjugated diene polymer comprising a first step that includes polymerizing a conjugated diene compound in the presence of a reaction product (a) of a compound shown by the following general formula (1) and a compound shown by the following general formula: RLi (wherein R represents an alkyl group having 1 to 16 carbon atoms or an aryl group having 6 to 20 carbon atoms) to obtain a conjugated diene polymer, and a second step that includes reacting the conjugated diene polymer with a compound (b) shown by the following general formula (2) or (3),

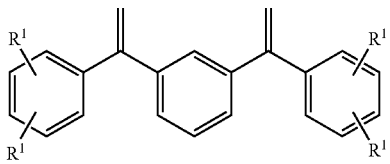
(1)

wherein R¹ represents a hydrogen atom or an alkyl group having 1 to 16 carbon atoms,

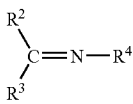
(2)

wherein R² and R³ individually represent a hydrogen atom, an aralkyl group having 7 to 20 carbon atoms, or an organosiloxy group, and R⁴ represents a hydrogen atom, a trialkylsilyl group having 3 to 18 carbon atoms, an alkyl group having 1 to 20 carbon atoms, an aryl group having 6 to 20 carbon atoms, an aralkyl group having 7 to 20 carbon atoms, or an organosiloxy group,

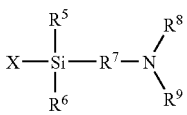
(3)

wherein R⁵ and R⁶ individually represent an alkyl group having 1 to 20 carbon atoms, an aryl group having 6 to 20 carbon atoms, an aralkyl group having 7 to 20 carbon atoms, or an organosiloxy group, X represents an alkoxy group having 1 to 20 carbon atoms, an allyloxy group having 6 to 20 carbon atoms, or a halogen atom, R⁷ represents a methylene group, an alkylene group having 2 to 20 carbon atoms, or an alkylidene group having 2 to 20 carbon atoms, and R⁸ and R⁹ individually represent a trialkylsilyl group having 3 to 18 carbon atoms when R⁸ and R⁹ do not bond to each other, or bond to each other to form a cyclic structure that is formed by the nitrogen atom that is bonded to R⁸ and R⁹, two silicon atoms, and 1 to 10 carbon atoms.

[2] The method for producing an amino group-containing conjugated diene polymer according to [1], wherein the conjugated diene compound is isoprene or butadiene.

[3] The method for producing an amino group-containing conjugated diene polymer according to [1] or [2], wherein at least one of the first step and the second step is performed in the presence of at least one of a compound shown by the following general formula (4) and a compound shown by the following general formula (5),

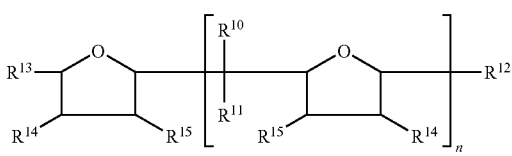
(4)

wherein R¹⁰, R¹¹, R¹², R¹³, R¹⁴, and R¹⁵ individually represent a hydrogen atom, an alkyl group having 1 to 20 carbon atoms, or an aryl group having 6 to 20 carbon atoms, and n represents an integer from 1 to 5,

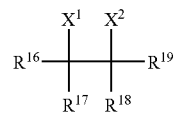
(5)

wherein R¹⁶, R¹⁷, R¹⁸, and R¹⁹ individually represent a hydrogen atom, an alkyl group having 1 to 20 carbon atoms, or an aryl group having 6 to 20 carbon atoms, and X¹ and X² individually represent an alkoxy group having 1 to 20 carbon atoms, an allyloxy group having 6 to 20 carbon atoms, a sulfur atom-containing functional group, or a phosphorus atom-containing functional group.

[4] A method for producing a block copolymer comprising copolymerizing an amino group-containing conjugated diene polymer produced by the method for producing an amino group-containing conjugated diene polymer according to any one of [1] to [3] and an amino acid derivative having a carbamate structure to obtain an A-B-A block copolymer that includes an amino acid block (A) and a conjugated diene block (B).

[5] The method for producing a block copolymer according to [4], wherein the amino acid derivative is a compound (c) shown by any of the following general formulas (6) to (8),

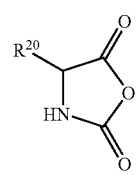
(6)

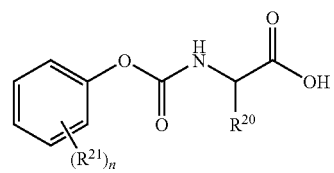
(7)

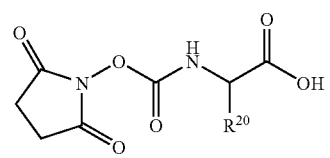
(8)

where, in the formulas (6) to (8): R²⁰ represents a hydrogen atom or an organic group having one or more carbon atoms, in the formula (7): R²¹ represents a hydrogen atom or an electron-attracting group, and n represents an integer from 1 to 5, provided that a plurality of R²¹ may be the same or different when n is an integer equal to or larger than 2.

[6] The method for producing a block copolymer according to [5], wherein R²⁰ in the general formulas (6) to (8) is a group having an ester structure.

[7] The method for producing a block copolymer according to [5] or [6], wherein R²⁰ in the general formulas (6) to (8) is a group shown by the following general formula (9),

—R²²—COO—R²³ (9)

wherein $R^{22}$ represents a methylene group or an alkylene group having 2 to 10 carbon atoms, and $R^{23}$ represents an aromatic ring-containing hydrocarbon group having 6 to 20 carbon atoms.

[8] The method for producing a block copolymer according to any one of [5] to [7], wherein $R^{21}$ in the general formula (7) is an electron-attracting group.

[9] The method for producing a block copolymer according to any one of [5] to [8], wherein $R^{21}$ in the general formula (7) is a nitro group or a halogen atom at the para position.

[10] An amino group-containing conjugated diene polymer shown by the following general formula (10),

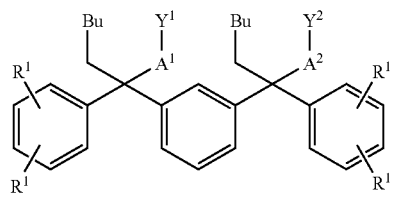
(10)

wherein $R^1$ represents a hydrogen atom or an alkyl group having 1 to 16 carbon atoms, Bu represents a butyl group, $A^1$ and $A^2$ represent a polydiene polymer chain that includes a conjugated diene compound as a monomer unit, and $Y^1$ and $Y^2$ represent hydrogen or a functional group shown by the following general formula (11), provided that at least one of $Y^1$ and $Y^2$ is a functional group shown by the general formula (11),

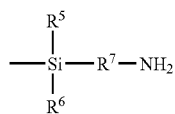
(11)

wherein $R^5$ and $R^6$ represent an alkyl group having 1 to 20 carbon atoms, an aryl group having 6 to 20 carbon atoms, an aralkyl group having 7 to 20 carbon atoms, or an organosiloxy group, and $R^7$ represents a methylene group, an alkylene group having 2 to 20 carbon atoms, or an alkylidene group having 2 to 20 carbon atoms.

[11] An A-B-A block copolymer including an amino acid block (A) and a conjugated diene block (B), the block copolymer being obtained by copolymerizing the amino group-containing conjugated diene polymer according to [10] and a compound shown by any of the following general formulas (6) to (8),

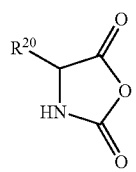
(6)

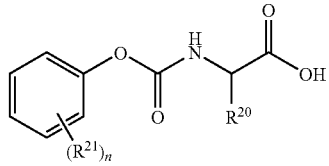
(7)

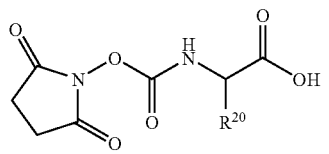
(8)

where, in the formulas (6) to (8): $R^{20}$ represents a hydrogen atom or an organic group having one or more carbon atoms, in the formula (7): $R^{21}$ represents a hydrogen atom or an electron-attracting group, and n represents an integer from 1 to 5, provided that a plurality of $R^{21}$ may be the same or different when n is an integer equal to or larger than 2.

[12] The block copolymer according to [11], the block copolymer being shown by the following general formula (12),

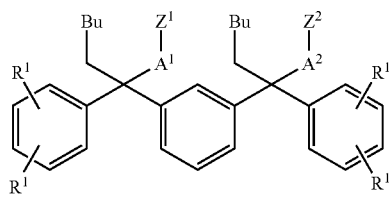
(12)

wherein $R^1$ represents a hydrogen atom or an alkyl group having 1 to 16 carbon atoms, $A^1$ and $A^2$ represent a polydiene polymer chain that includes a conjugated diene compound as a monomer unit, Bu represents a butyl group, and $Z^1$ and $Z^2$ represent hydrogen, a group derived from a functional group shown by the general formula (11), or a polyamino acid polymer chain shown by the following general formula (13), provided that at least one of $Z^1$ and $Z^2$ is a polyamino acid polymer chain shown by the general formula (13),

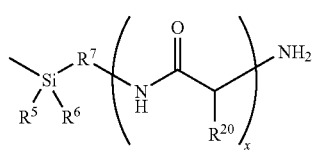
(13)

wherein $R^5$ and $R^6$ individually represent an alkyl group having 1 to 20 carbon atoms, an aryl group having 6 to 20 carbon atoms, an aralkyl group having 7 to 20 carbon atoms, or an organosiloxy group, $R^7$ represents a methylene group, an alkylene group having 2 to 20 carbon atoms, or an alkylidene group having 2 to 20 carbon atoms, $R^{20}$ represents a hydrogen atom or a monovalent organic group having one or more carbon atoms, and x represents an integer from 1 to 500.

The method for producing an amino group-containing conjugated diene polymer according to the present invention can produce an amino group-containing conjugated diene polymer having a narrow molecular weight distribution and a high modification rate (primary amino group introduction rate).

The method for producing a block copolymer according to the present invention can safely produce an A-B-A block copolymer that includes an amino acid block (A) and a conjugated diene block (B) and exhibits excellent tensile strength and elongation in high yield without using phosgene.

The amino group-containing conjugated diene polymer according to the present invention has a narrow molecular weight distribution and a high modification rate (primary amino group introduction rate).

The block copolymer according to the present invention is an A-B-A block copolymer that includes the amino acid block (A) and the conjugated diene block (B) and exhibits excellent tensile strength and elongation.

BEST MODE FOR CARRYING OUT THE INVENTION

Preferred embodiments of the present invention are described below. Note that the present invention is not limited to the following embodiments. Various modifications, improvements, etc., may be appropriately made of the following embodiments without departing from the scope of the present invention based on the knowledge of a person having ordinary skill in the art.

1. Method for Producing Amino Group-Containing Conjugated Diene Polymer (First Step)

The first step includes polymerizing a conjugated diene compound in the presence of a reaction product (a) (hereinafter may be referred to as "component (a)") of a compound (1) and an organolithium compound to obtain a conjugated diene polymer.

(Compound (1))

The compound (1) used in the first step includes two or more reactive functional groups, and has a chemical structure shown by the following general formula (1). In the general formula (1), $R^1$ represents a hydrogen atom or an alkyl group having 1 to 16 carbon atoms. $R^1$ is preferably hydrogen or an alkyl group having 1 to 12 carbon atoms, and more preferably hydrogen or an alkyl group having 1 to 4 carbon atoms.

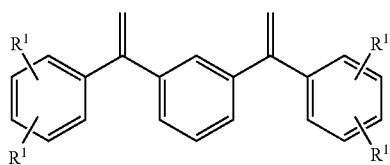

(1)

Specific examples of the compound (1) include 1,3-di(1-phenylethenyl)benzene, 1,3-bis[(4-methylphenyl)ethenyl]benzene, 1,3-bis[(2,3-dimethylphenyl)ethenyl]benzene, 1,3-bis[(4-ethylphenyl)ethenyl]benzene, 1,3-bis[(4-tert-butylphenyl)ethenyl]benzene, 1,3-bis[(4-dodecylphenyl)ethenyl]benzene, and the like. Among these, 1,3-di(1-phenylethenyl)benzene and 1,3-bis[(4-methylphenyl)ethenyl]benzene are preferable.

(Organolithium Compound)

The organolithium compound used in the first step reacts with the compound (1) described the above, to produce the component (a) (difunctional anionic initiator), and has a chemical structure shown by the general formula: RLi (wherein R represents an alkyl group having 1 to 16 carbon atoms or an aryl group having 6 to 20 carbon atoms). R in the general formula: RLi is preferably an alkyl group having 1 to 4 carbon atoms or a phenyl group. Specific examples of the organolithium compound shown by the general formula: RLi include n-butyllithium, sec-butyllithium, tert-butyllithium, i-propyllithium, n-propyllithium, methyllithium, ethyllithium, phenyllithium, and the like. Among these, n-butyllithium, sec-butyllithium, tert-butyllithium are preferable.

(Reaction Product (a))

The component (a) is a difunctional anionic initiator, and produced by reacting the compound (1) with the organolithium compound. The compound (1) may be reacted with the organolithium compound by a known method. For example, the compound (1) may be reacted with the organolithium compound in a non-polar solvent to produce the component (a). Specific examples of the non-polar solvent include saturated hydrocarbons such as pentane and hexane; cyclic hydrocarbons such as cyclohexane and cyclopentane; and aromatic hydrocarbons such as benzene and toluene. These non-polar solvents may be used in combination.

The compound (1) may be reacted with the organolithium compound under arbitrary reaction conditions. The compound (1) is normally reacted with the organolithium compound at −10 to 120° C., and preferably 0 to 100° C. for 0.5 to 50 hours, and preferably 1 to 10 hours.

(Conjugated Diene Compound)

The conjugated diene compound that is polymerized in the first step in the presence of the component (a) is not particularly limited insofar as the conjugated diene compound has a conjugated diene bond in the molecular structure. Specific examples of the conjugated diene compound include isoprene, butadiene, 2,3-dimethyl-1,3-butadiene, 1,3-pentadiene, 2-methyl-1,3-octadiene, 1,3-hexadiene, 1,3-cyclohexadiene, 4,5-diethyl-1,3-octadiene, 3-butyl-1,3-octadiene, myrcene, chloroprene, and the like. Among these, isoprene and butadiene are preferable.

A conjugated diene polymer is obtained by polymerizing the conjugated diene compound in the presence of the component (a). A solvent used for polymerization is not particularly limited. A non-polar solvent (e.g., saturated hydrocarbons such as pentane and hexane; cyclic hydrocarbons such as cyclohexane and cyclopentane; and aromatic hydrocarbons such as benzene and toluene), or a mixed solvent of these non-polar solvents may normally be used. The polymerization conditions are not particularly limited. The conjugated diene compound is normally polymerized at −10 to 150° C. (preferably 0 to 120° C.) for 1 minute to 30 hours (preferably 5 minutes to 5 hours).

The molar equivalent of the conjugated diene compound with respect to the component (a) may be appropriately set depending on the molecular weight of the desired conjugated diene polymer. The molar equivalent of the conjugated diene compound with respect to the component (a) is normally 7 to 150,000, preferably 35 to 150,000, and more preferably 95 to 1100.

The number average molecular weight (Mn) of the conjugated diene compound is preferably 1000 to 1,000,000, and more preferably 3000 to 100,000. If the number average molecular weight (Mn) of the conjugated diene compound is less than 1000, a block copolymer produced using the conjugated diene compound may have poor physical properties (e.g., elongation at break). If the number average molecular weight (Mn) of the conjugated diene compound is more than 1,000,000, a block copolymer produced using the conjugated diene compound may have poor biocompatibility. When using isoprene as the conjugated diene compound, the total content of cis-1,4-bonds and trans-1,4-bonds in the isoprene unit is preferably 20% or more, and more preferably 30% or more from the viewpoint of flexibility.

It is preferable to use a Lewis base compound during polymerization in order to adjust the vinyl bond content in the conjugated diene site of the resulting conjugated diene polymer. Various compounds may be used as the Lewis base compound. It is preferable to use an ether compound or a tertiary amine from the viewpoint of availability in industrial applications. Specific examples of the ether compound include cyclic ethers such as tetrahydrofuran, tetrahydropyran, and 1,4-dioxane; aliphatic monoethers such as diethyl ether and dibutyl ether; aliphatic diethers such as ethylene glycol dimethyl ether, ethylene glycol diethyl ether, ethylene glycol dibutyl ether, diethylene glycol diethyl ether, and diethylene glycol dibutyl ether; aromatic ethers such as diphenyl ether and anisole; and the like. Specific examples of the tertiary amine compound include triethylamine, tripropylamine, tributylamine, N,N,N',N'-tetramethylethylenediamine, N,N-diethylaniline, pyridine, quinoline, and the like. A conjugated diene polymer that exhibits excellent storage stability may be obtained by adding 2,6-di-tert-butyl-p-cresol or the like that is effective for preventing oxidation of the diene site as an antioxidant.

(Second Step)

The second step includes reacting the conjugated diene polymer obtained by the first step with a compound (b) (i.e., modifier). This reaction normally produces a tertiary amino group-containing conjugated diene polymer in which part of the structure of the compound (b) is bonded to the end amino group as a protecting group. An amino group-containing conjugated diene polymer that includes a primary amino group at each end can be obtained by deprotecting the tertiary amino group of the tertiary amino group-containing conjugated diene polymer.

(Compound (b))

The compound (b) can modify the conjugated diene polymer, and can produce the tertiary amino group-containing conjugated diene polymer (i.e., modifier). The compound (b) is shown by the following general formula (2) or (3).

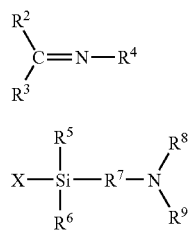

In the general formula (2), $R^2$ and $R^3$ individually represent a hydrogen atom, an aralkyl group having 7 to 20 carbon atoms, or an organosiloxy group. $R^4$ represents a hydrogen atom, a trialkylsilyl group having 3 to 18 carbon atoms, an alkyl group having 1 to 20 carbon atoms, an aryl group having 6 to 20 carbon atoms, an aralkyl group having 7 to 20 carbon atoms, or an organosiloxy group.

Specific examples of the compound (b) shown by the general formula (2) include N-(trimethylsilyl)benzaldimine, N-(trimethylsilyl)ethylideneamine, N-(triphenylsilyl)benzaldimine, N-(trimethylsilyl)-1-phenylpentylideneamine, N-(tert-butyldimethylsilyl)ethylideneamine, N-(di-tert-butylmethylsilyl)-1-phenylpentylideneamine, N-(di-tert-butylmethylsilyl)ethylideneamine, N-benzylidenebenzenesulfonamide, N-α-phenylbenzylidene)sulfonamide, and the like. Among these, N-(trimethylsilyl)benzaldimine is preferable.

In the general formula (3), $R^5$ and $R^6$ represent an alkyl group having 1 to 20 carbon atoms, an aryl group having 6 to 20 carbon atoms, an aralkyl group having 7 to 20 carbon atoms, or an organosiloxy group. X represents an alkoxy group having 1 to 20 carbon atoms, an allyloxy group having 6 to 20 carbon atoms, or a halogen atom. $R^7$ represents a methylene group, an alkylene group having 2 to 20 carbon atoms, or an alkylidene group having 2 to 20 carbon atoms. $R^8$ and $R^9$ may be independent groups or may bond to each other to form acyclic structure. $R^8$ and $R^9$ individually represent a trialkylsilyl group having 3 to 18 carbon atoms when $R^8$ and $R^9$ do not bond to each other.

In case, $R^8$ and $R^9$ bond to each other to form a cyclic structure that is formed by the nitrogen atom that is bonded to $R^8$ and $R^9$, two silicon atoms, and 1 to 10 carbon atoms.

Specific examples of the compound (b) shown by the general formula (3) include N,N-bis(trimethylsilyl)aminopropyldimethylmethoxysilane, N,N-bis(trimethylsilyl)aminopropyldimethylchlorosilane, 3-(2,2,5,5-tetramethyl-1-aza-2,5-disilacyclopentyl)propyldimethylmethoxysilane, N,N-bis(trimethylsilyl)aminopropyldimethylethoxysilane, N,N-bis(trimethylsilyl)aminopropyldimethylphenoxysilane, 3-(2,2,5,5-tetramethyl-1-aza-2,5-disilacyclopentyl) propyldimethylchlorosilane, 3-(2,2,5,5-tetramethyl-1-aza-2,5-disilacyclopentyl)propyldimethylethoxysilane, N,N-bis(trimethylsilyl)aminoethyldimethylmethoxysilane, N,N-bis(trimethylsilyl)aminoethyldimethylethoxysilane, and the like. Among these, N,N-bis(trimethylsilyl)aminopropyldimethylmethoxysilane, N,N-bis(trimethylsilyl)aminopropyldimethylchlorosilane, and 3-(2,2,5,5-tetramethyl-1-aza-2,5-disilacyclopentyl)propyldimethylmethoxysilane are preferable.

The conjugated diene polymer may be reacted (modified) with the compound (b) in a state in which the compound (b) is added to the polymerization system without isolating the conjugated diene polymer from the polymerization system. The conjugated diene polymer may be modified with the compound (b) under arbitrary conditions. The conjugated diene polymer is normally modified with the compound (b) at 0 to 150° C. (preferably 30 to 100° C.) for 1 minute to 30 hours (preferably 5 minutes to 5 hours). Methanol is normally added after the reaction time has elapsed in order to terminate the modification reaction and inactivate excessive organolithium compound, for example. Note that the mixture may be concentrated after terminating the modification reaction as needed, and the reaction solution may be mixed with a large quantity of methanol to purify the reaction product via reprecipitation.

A conjugated diene polymer that includes a tertiary amino group at each end (i.e., tertiary amino group-containing conjugated diene polymer) is obtained by modifying the conjugated diene polymer using the compound (b). An amino group-containing conjugated diene polymer that includes a primary amino group at each end can be obtained by deprotecting the tertiary amino group-containing conjugated diene polymer.

The compound (b) is normally used in an amount of 0.8 to 10 molar equivalents, preferably 0.9 to 7 molar equivalents, and more preferably 1 to 5 molar equivalents, based on the organolithium compound. If the amount of the compound (b) is within the above range, each end of the conjugated diene polymer can be modified more efficiently while facilitating purification and removal of unreacted modifier. Therefore, that is preferable. Moreover, a block copolymer produced using the amino group-containing conjugated diene polymer obtained by reacting the conjugated diene polymer with the compound (b) exhibits constant (stable) strength. Therefore, that is preferable.

A deprotection reaction may proceed with termination of the modification reaction, concentration, purification, and the like. If necessary, a deprotection reaction is caused to occur by performing a treatment after terminating the modification reaction. The deprotection reaction conditions vary depending on the type of the compound (b) and the like. Examples of the treatment after terminating the modification reaction include treating the tertiary amino group-containing conjugated diene polymer using an appropriate acid or base. The treatment using an acid or base may be performed under arbitrary conditions. The treatment temperature is normally 0 to 100° C., and preferably 10 to 70° C., and the treatment time is normally 1 minute to 10 hours, and preferably 5 minutes to 5 hours. A recrystallization operation or the like may optionally be performed after deprotection.

In the present invention, it is preferable to perform at least one of the first step and the second step in the presence of at least one of a compound shown by the following general formula (4) and a compound shown by the following general formula (5).

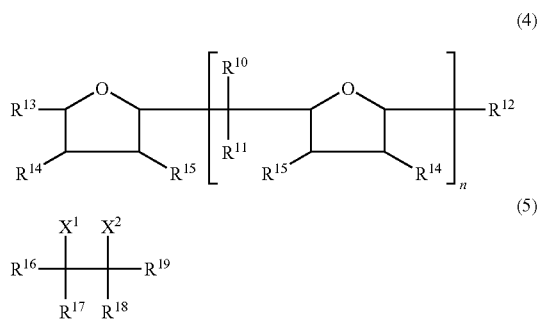

(Compound Shown by General Formula (4))

The compound shown by the general formula (4) is an oxolanyl compound. In the general formula (4), $R^{10}$, $R^{11}$, $R^{12}$, $R^{13}$, $R^{14}$, and $R^{15}$ individually represent a hydrogen atom, an alkyl group having 1 to 20 carbon atoms, or an aryl group having 6 to 20 carbon atoms, and n represents an integer from 1 to 5. Specific examples of the oxolanyl compound include bis(2-oxolanyl)methane, 2,2-bis(2-oxolanyl)propane, 1,1-bis(2-oxolanyl)ethane, 2,2-bis(2-oxolanyl)butane, 2,2-bis(5-methyl-2-oxolanyl)propane, 2,2-bis(3,4,5-trimethyl-2-oxolanyl)propane, trimeric 2,5-bis(2-oxolanyl-2-propyl) oxolane, and the like. Among these, 2,2-di(tetrahydrofuryl) propane is preferable.

(Compound Shown by General Formula (5))

In the general formula (5), $R^{16}$, $R^{17}$, $R^{18}$, and $R^{19}$ individually represent a hydrogen atom, an alkyl group having 1 to 20 carbon atoms, or an aryl group having 6 to 20 carbon atoms, and $X^1$ and $X^2$ individually represent an alkoxy group having 1 to 20 carbon atoms, an allyloxy group having 6 to 20 carbon atoms, a sulfur atom-containing functional group, or a phosphorus atom-containing functional group. Specific examples of the compound shown by the general formula (5) include polyalkylene glycol ether derivatives such as ethylene glycol dibutyl ether, propylene glycol diethyl ether, and propylene glycol diethyl ether; alkyl or aryl-substituted dithioether derivatives such as 3,6-dithiaoctane; phosphine compounds such as diphosphinoethane and diphosphinopropane; compounds in which heteroatoms of these compounds are combined; and the like. Among these, propylene glycol ethyl propyl ether and propylene glycol diethyl ether are preferable.

When using the compound (oxolanyl compound) shown by the general formula (4) in the first step, the oxolanyl compound is normally used in an amount of 0.01 to 15 molar equivalents, and preferably 0.02 to 10 molar equivalents, based on the organolithium compound. If the amount of the oxolanyl compound within the above range, a high modification efficiency is achieved.

When using the compound (oxolanyl compound) shown by the general formula (4) in the second step, the oxolanyl compound is normally used in an amount of 0.02 to 30 molar equivalents, and preferably 0.04 to 20 molar equivalents, based on the component (a). If the amount of the oxolanyl compound within the above range, a high modification efficiency is achieved.

When performing the second step in the presence of at least one of the compound shown by the general formula (4) and the compound shown by the general formula (5), it is preferable to perform the first step in the presence of a metal alkoxide (preferably an alkali metal alkoxide, and more preferably a lithium alkoxide having 2 to 16 carbon atoms). A conjugated diene polymer that has a high 1,4-addition structure content, exhibits excellent elastomer properties, and has a more uniform molecular weight distribution can be obtained by performing the first step in the presence of a metal alkoxide, as compared with the case of performing the first step in the absence of a metal alkoxide. When performing the first step in the absence of a metal alkoxide, the molecular weight distribution may become non-uniform due to association of lithium so that it may be difficult to introduce an amino group at each end. As a result, the resulting block copolymer may exhibit low strength.

2. Amino Group-Containing Conjugated Diene Polymer

An amino group-containing conjugated diene polymer according to the present invention has a chemical structure shown by the following general formula (10), and has a narrow molecular weight distribution and a high modification rate (primary amino group introduction rate). The amino group-containing conjugated diene polymer may be produced by the method for producing the amino group-containing conjugated diene pllymer according to the present invention described the above. The amino group-containing conjugated diene polymer of the present invention that has a chemical structure shown by the general formula (10) can be produced using the organolithium compound that has high reactivity and is easily available, and the compound (b) that is relatively inexpensive. Since the amino group-containing conjugated diene polymer according to the present invention has a high amino group introduction rate, it is suitable as a material for producing a block copolymer described later.

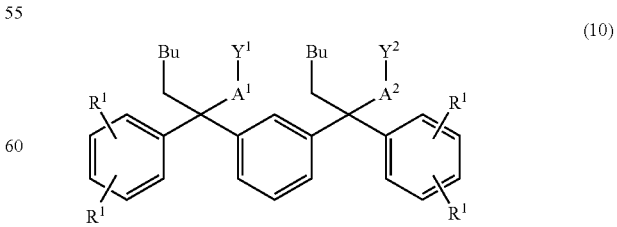

In the general formula (10), $R^1$ represents a hydrogen atom or an alkyl group having 1 to 16 carbon atoms, Bu represents a butyl group, $A^1$ and $A^2$ represent a polydiene polymer chain that includes a conjugated diene compound as a monomer unit, and $Y^1$ and $Y^2$ represent hydrogen or a functional group shown by the following general formula (11), provided that at least one of $Y^1$ and $Y^2$ is a functional group shown by the general formula (11).

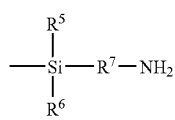

(11)

In the general formula (11), $R^5$ and $R^6$ represent an alkyl group having 1 to 20 carbon atoms, an aryl group having 6 to 20 carbon atoms, an aralkyl group having 7 to 20 carbon atoms, or an organosiloxy group, and $R^7$ represents a methylene group, an alkylene group having 2 to 20 carbon atoms, or an alkylidene group having 2 to 20 carbon atoms.

The molecular weight distribution (Mw/Mn) of the amino group-containing conjugated diene polymer according to the present invention is normally 1.0 to 2.5, preferably 1.0 to 2.0, and more preferably 1.0 to 1.6.

The amino group-containing conjugated diene polymer according to the present invention may be produced by the method for producing the amino group-containing conjugated diene polymer according to the present invention described the above. In this case, a primary amino group is introduced into the amino group-containing conjugated diene polymer at a very high modification rate (primary amino group introduction rate). The modification rate of the amino group-containing conjugated diene polymer according to the present invention is normally 60 to 100%, preferably 70 to 100%, and more preferably 80 to 100%. The modification rate of the amino group-containing polydiene may be determined from the integral ratio of a signal attributed to the component (a) and a signal attributed to the modifier that are measured by $^1$H-NMR, or may be determined by a titration method using an acid.

The number average molecular weight (Mn) of the amino group-containing conjugated diene polymer according to the present invention is normally 1000 to 1,000,000, preferably 3000 to 100,000, and more preferably 7000 to 70,000. If the number average molecular weight (Mn) of the amino group-containing conjugated diene polymer is less than 1000, a block copolymer (i.e., an A-B-A block copolymer that includes an amino acid block (A) and a conjugated diene block (B)) produced using the amino group-containing conjugated diene polymer may have poor physical properties (e.g., elongation at break). If the number average molecular weight (Mn) of the amino group-containing conjugated diene polymer is more than 1,000,000, a block copolymer produced using the amino group-containing conjugated diene polymer may have poor biocompatibility. The number average molecular weight (Mn) may be determined from the integral ratio of a signal attributed to the component (a) and a signal attributed to the conjugated diene polymer that are measured by $^1$H-NMR.

3. Method for Producing Block Copolymer

A method for producing a block copolymer according to the present invention includes copolymerizing an amino group-containing conjugated diene polymer produced by the above method for producing an amino group-containing conjugated diene polymer and an amino acid derivative having a carbamate structure to obtain an A-B-A block copolymer that includes an amino acid block (A) and a conjugated diene block (B). Specifically, when mixing and heating the amino group-containing conjugated diene polymer and the amino acid derivative having a carbamate structure, a phenol or N-hydroxysuccinimide and carbon dioxide are eliminated (i.e., an amide bond (peptide bond) is produced) so that the desired block copolymer is obtained. The amino acid derivative having a carbamate structure is preferably a compound (c) shown by any of the following general formulas (6) to (8).

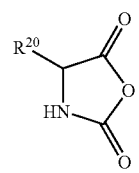

(6)

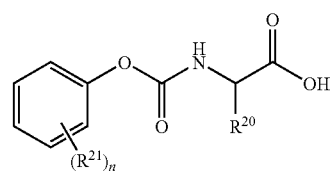

(7)

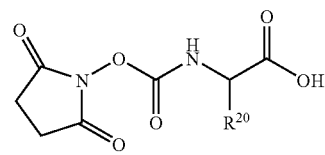

(8)

(Compound (c))

In the general formulas (6) to (8), $R^{20}$ is preferably a hydrocarbon group having 3 to 20 carbon atoms or a monovalent organic group having an ester structure, and more preferably a group shown by the following general formula (9): —$R^{22}$—COO—$R^{23}$ (wherein $R^{22}$ represents a methylene group or an alkylene group having 2 to 10 carbon atoms, and $R^{23}$ represents an alkyl group having 1 to 10 carbon atoms or an aromatic ring-containing hydrocarbon group having 6 to 20 carbon atoms). Specific examples of the alkylene group having 2 to 10 carbon atoms represented by $R^{22}$ in the general formula (9) include a propylene group, a butylene group, and the like. Specific examples of the aromatic ring-containing hydrocarbon group having 6 to 20 carbon atoms represented by $R^{23}$ in the general formula (9) include a benzyl group and the like.

The group represented by $R^{21}$ in the general formula (7) is preferably an electron-attracting group. If the group represented by $R^{21}$ in the general formula (7) is an electron-attracting group, the electron density of the carbonyl carbon of the carbamate structure decreases to facilitate a nucleophilic attack on the carbonyl carbon. Specific examples of the electron-attracting group include a nitro group, a halogen atom such as a chlorine atom, a perfluoroalkyl group that may be substituted, a perchloroalkyl group that may be substituted, an ester group, a sulfonate group, an acetyl group, a cyano group, a benzoyl group, and the like. Among these, a nitro group, a halogen atom, a halogen-substituted alkyl group, and a sulfonate group are preferable. A nitro group or a halogen atom at the para position is more preferable. If the group represented by $R^{21}$ in the general formula (7) is a hydrogen atom, the handling capability is improved although a nucleophilic attack on the carbonyl carbon of the carbamate structure is not facilitated to a large extent. Therefore, that is preferable.

Specific examples of the compound (c) shown by the general formula (6) include γ-benzyl L-glutamate N-carboxylic anhydride, β-benzyl L-aspartate N-carboxylic anhydride, L-leucine N-carboxylic anhydride, phenylalanine N-carboxylic anhydride, L-proline N-carboxylic anhydride, O-benzyl-L-tyrosine N-carboxylic anhydride, γ-benzyl L-glutamate N-carboxylic anhydride, β-benzyl L-aspartate N-carboxylic anhydride, L-leucine N-carboxylic anhydride, L-phenylalanine N-carboxylic anhydride, L-proline N-carboxylic anhydride, O-benzyl-L-tyrosine N-carboxylic anhydride, and the like. Among these, γ-benzyl L-glutamate N-carboxylic anhydride (BLG-NCA), β-benzyl L-aspartate N-carboxylic anhydride, O-benzyl-L-tyrosine N-carboxylic anhydride, γ-benzyl L-glutamate N-carboxylic anhydride, β-benzyl L-aspartate N-carboxylic anhydride, and O-benzyl-L-tyrosine N-carboxylic anhydride are preferable.

Specific examples of the compound (c) shown by the general formula (7) include N-(4-nitrophenoxycarbonyl)-γ-benzyl L-glutamate, N-(4-nitrophenoxycarbonyl)-β-benzyl L-aspartate, N-(4-nitrophenoxycarbonyl)-L-leucine, N-(4-nitrophenoxycarbonyl)-L-phenylalanine, N-(4-nitrophenoxycarbonyl)-L-proline, N-(4-nitrophenoxycarbonyl)-O-benzyl-L-tyrosine, N-(phenoxycarbonyl)-γ-benzyl L-glutamate, N-(phenoxycarbonyl)-β-benzyl L-aspartate, N-(phenoxycarbonyl)-L-leucine, N-(phenoxycarbonyl)-L-phenylalanine, N-(phenoxycarbonyl)-L-proline, N-(phenoxycarbonyl)-O-benzyl-L-tyrosine, and the like. Among these, N-(4-nitrophenoxycarbonyl)-γ-benzyl L-glutamate (Np-BLG), N-(4-nitrophenoxycarbonyl)-β-benzyl L-aspartate, and N-(4-nitrophenoxycarbonyl)-O-benzyl-L-tyrosine are preferable.

Specific examples of the compound (c) shown by the general formula (8) include N-(succinimidyloxycarbonyl)-γ-benzyl L-glutamate, N-(succinimidyloxycarbonyl)-β-benzyl L-aspartate, N-(succinimidyloxycarbonyl)-L-leucine, N-(succinimidyloxycarbonyl)-L-phenylalanine, N-(succinimidyloxycarbonyl)-L-proline, N-(succinimidyloxycarbonyl)-O-benzyl-L-tyrosine, and the like. Among these, N-(succinimidyloxycarbonyl)-γ-benzyl L-glutamate, N-(succinimidyloxycarbonyl)-β-benzyl L-aspartate, and N-(succinimidyloxycarbonyl)-O-benzyl-L-tyrosine are preferable.

The amino group-containing conjugated diene polymer and the compound (c) may be copolymerized in an appropriate solvent. Specific examples of the solvent include amide solvents such as dimethylacetamide, dimethylformamide, and N-methylpyrrolidone; sulfoxide solvents such as dimethyl sulfoxide; ketone solvents such as methyl ethyl ketone and acetone; ester solvents such as ethyl acetate and butyl acetate; nitrile solvents such as acetonitrile; halogen solvents such as chloroform and dichloromethane; ether solvents such as tetrahydrofuran and cyclopentane monomethyl ether; and the like. It is preferable to use a solvent that has a high dielectric constant and a high hydrogen bonding capability since the polymerization reaction is promoted so that a high yield and a high degree of polymerization are achieved. Specifically, it is preferable to use the amide solvent or the sulfoxide solvent. The solvent is preferably used in an amount of 20 to 500 parts by mass, and more preferably 25 to 200 parts by mass, based on 100 parts by mass of the compound (c). If the amount of the solvent is less than 20 parts by mass, the compound (c) may not be sufficiently dissolved. If the amount of the solvent is more than 500 parts by mass, the reaction rate may decrease to a large extent.

A catalyst is not necessarily used when copolymerizing the amino group-containing conjugated diene polymer and the compound (c). Note that the reaction rate can be significantly increased while decreasing reaction temperature when copolymerizing the amino group-containing conjugated diene polymer and the compound (c) in the presence of a catalyst. Therefore, that is preferable. Specific examples of the catalyst include basic compounds. Preferable examples of the catalyst include zeolites such as a molecular sieve; basic alkali metal salts such as sodium hydrogen carbonate; tertiary amine compounds such as triethylamine, 1,8-diazabicyclo[5,4,0]undec-7-ene, and 1,4-diazabicyclo[2,2,2]octane; aromatic amine compounds such as pyridine; pyrrolidone compounds such as methylpyrrolidone and polyvinylpyrrolidone; and the like.

When copolymerizing the amino group-containing conjugated diene polymer and the compound (c) without using a catalyst, the reaction temperature is preferably 50 to 110° C., and more preferably 55 to 80° C. The reaction time is preferably 3 to 200 hours, more preferably 12 to 96 hours, and particularly preferably 24 to 72 hours. When copolymerizing the amino group-containing conjugated diene polymer and the compound (c) in the presence of a catalyst, the reaction temperature is preferably 10 to 110° C., more preferably 30 to 80° C., and particularly preferably 50 to 70° C. The reaction time is preferably 3 to 200 hours, more preferably 5 to 72 hours, and particularly preferably 10 to 48 hours. If the reaction temperature in the presence of a catalyst is less than 10° C., the reaction may not sufficiently proceed. If the reaction temperature in the presence of a catalyst is more than 110° C., the compound (c) may be decomposed. If the reaction time in the presence of a catalyst is less than 3 hours, the copolymerization reaction may not sufficiently proceed. If the reaction time in the presence of a catalyst is more than 200 hours, undesirable secondary reactions may occur.

The compound (c) may normally be synthesized from an amino acid or an amino acid derivative and a compound that has a cyclic structure and includes a divalent group shown by "—COO—" (hereinafter referred to as "specific cyclic compound") in the presence of an appropriate solvent. The specific cyclic compound is preferably used in an amount of 0.1 to 10 molar equivalents, and more preferably 0.5 to 1.5 molar equivalents, with respect to the amino acid or the amino acid derivative. If the amount of the specific cyclic compound is less than 0.1 molar equivalents, the reaction may not sufficiently proceed. If the amount of the specific cyclic compound is more than 10 molar equivalents, it may be difficult to separate excess of the specific cyclic compound from the reaction system during purification.

Specific examples of the solvent include amide solvents such as dimethylacetamide, dimethylformamide, and N-methylpyrrolidone; sulfoxide solvents such as dimethyl sulfoxide; ketone solvents such as methyl ethyl ketone and acetone; ester solvents such as ethyl acetate and butyl acetate; nitrile solvents such as acetonitrile; halogen solvents such as chloroform and dichloromethane; ether solvents such as tetrahydrofuran and cyclopentane monomethyl ether; and the like. The solvent is preferably used in an amount of 10 to 1500 parts by mass, and more preferably 20 to 100 parts by mass, based on 100 parts by mass of the amino acid or the amino acid derivative and the specific cyclic compound in total. If the amount of the solvent is less than 10 parts by mass, the specific cyclic compound may not be sufficiently dissolved. If the amount of the solvent is more than 1500 parts by mass, the reaction rate may decrease to a large extent.

The compound (c) may be synthesized in the air. However, since the compound used or the product may be decomposed due to water contained in the air, it is desirable to synthesize the compound (c) in an inert gas atmosphere (e.g., argon or nitrogen). The reaction temperature is preferably 10 to 110° C., more preferably 20 to 70° C., and particularly preferably 30 to 60° C. If the reaction temperature is less than 10° C., the reaction rate may decrease to a large extent. If the reaction temperature is more than 110° C., the compound (c) may be melted and rapidly decomposed. The reaction time is preferably 1 to 100 hours, more preferably 10 to 60 hours, and particularly preferably 20 to 50 hours. If the reaction time is less than 1 hour, the reaction may not sufficiently proceed. If the reaction time is more than 100 hours, undesirable secondary reactions may occur.

Examples of the amino acid or the amino acid derivative used to synthesize the compound (c) include natural or synthetic amino acids. Specific examples of the natural or synthetic amino acids include natural amino acids such as glycine, alanine, valine, leucine, isoleucine, phenylalanine, methionine, γ-benzyl glutamate, γ-methyl glutamate, ∈-carbobenzoxy-lysine, and β-benzylaspartic acid, and active hydrogen-substituted amino acids thereof; synthetic amino acids that are D-isomers of these natural amino acids; and the like. It is preferable that the amino acid block (A) have an α-helix structure since the biocompatibility of the block copolymer may be significantly improved. Therefore, γ-benzyl L-glutamate, γ-methyl L-glutamate, ∈-carbobenzoxy-L-lysine, L-alanine, L-leucine, and L-isoleucine are preferable as the amino acid or the amino acid derivative.

When the amino acid or the amino acid derivative includes a plurality of carboxyl groups or amino groups in the molecular structure, it is preferable to protect the groups other than the carboxyl group or the amino group that is involved in the reaction. A known protection method may be used. A carboxyl group may be protected by esterification with a methyl group, an ethyl group, a benzyl group, a tert-butyl group, or the like. An amino group may be protected with a carbobenzyloxy group, a tert-butoxycarbonyl group, a benzoyl group, an acetyl group, or the like.

Specific examples of the specific cyclic compound used when synthesizing the compound (c) include compounds shown by the following general formulas (14) and (15) and compounds shown by the following general formula (16).

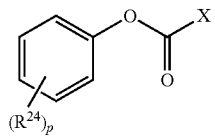

(14)

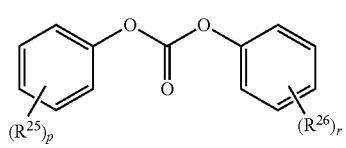

(15)

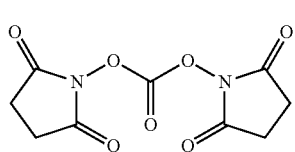

(16)

In the general formula (14), X represents a halogen atom (e.g., chlorine atom), $R^{24}$ represents a hydrogen atom or an electron-attracting group, and p represents an integer from 1 to 5. $R^{24}$ and p in the general formula (14) are the same as $R^{21}$ and n in the general formula (7). When p in the general formula (14) is an integer equal to or larger than 2, a plurality of $R^{24}$ may be the same or different.

In the general formula (15), $R^{25}$ and $R^{26}$ represent a hydrogen atom or an electron-attracting group, and q and r represent an integer from 1 to 5. Note that q and r may be the same or different. When q and r are integers equal to or larger than 2, a plurality of $R^{25}$ and a plurality of $R^{26}$ may be the same or different.

It is preferable that the group represented by $R^{24}$ in the general formula (14) and the groups represented by $R^{25}$ and $R^{26}$ in the general formula (15) be electron-attracting groups, since the electron density of the carbonyl carbon of the carbamate structure decreases to facilitate a nucleophilic attack on the carbonyl carbon. Specific examples of the electron-attracting group include a nitro group, a halogen atom such as a chlorine atom, a perfluoroalkyl group that may be substituted, a perchloroalkyl group that may be substituted, an ester group, a sulfonate group, an acetyl group, a cyano group, a benzoyl group, and the like. Among these, a nitro group, a halogen atom, a halogen-substituted alkyl group, and a sulfonate group are preferable. A nitro group or a halogen atom at the para position is more preferable. If the group represented by $R^{24}$ in the general formula (14) and the groups represented by $R^{25}$ and $R^{26}$ in the general formula (15) are hydrogen atoms, an excellent handling capability may be achieved although a nucleophilic attack on the carbonyl carbon of the carbamate structure is not facilitated to a large extent. Therefore, that is preferable.

Specific examples of the compound shown by the general formula (14) include phenoxycarbonyl chloride, 4-nitrophenoxycarbonyl chloride, 2,4-dinitrophenoxycarbonyl chloride, 4-nitrophenoxycarbonyl bromide, pentafluorophenoxycarbonyl chloride, and the like. Specific examples of the compound shown by the general formula (15) include bis(pentafluorophenyl) carbonate and the like.

4. Block Copolymer

A block copolymer according to the present invention is obtained by copolymerizing the amino group-containing conjugated diene polymer and a compound shown by any of the general formulas (6) to (8). The block copolymer according to the present invention is an A-B-A block copolymer that includes an amino acid block (A) and a conjugated diene block (B), and exhibits excellent biocompatibility and physical strength (tensile strength and elongation). The block copolymer according to the present invention preferably has a molecular structure shown by the following general formula (12).

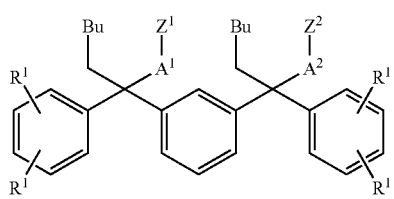

(12)

In the general formula (12), $R^1$ represents a hydrogen atom or an alkyl group having 1 to 16 carbon atoms, $A^1$ and $A^2$ represent a polydiene polymer chain that includes a conjugated diene compound as a monomer unit, and Bu represents a butyl group. $Z^1$ and $Z^2$ represent hydrogen, a group derived from a functional group shown by the general formula (11), or a polyamino acid polymer chain shown by the following general formula (13). Note that at least one of $Z^1$ and $Z^2$ is a polyamino acid polymer chain shown by the general formula (13).

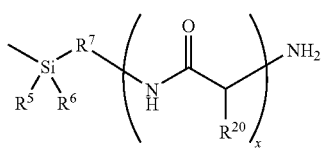

(13)

In the general formula (13), $R^5$ and $R^6$ individually represent an alkyl group having 1 to 20 carbon atoms, an aryl group having 6 to 20 carbon atoms, an aralkyl group having 7 to 20 carbon atoms, or an organosiloxy group, $R^7$ represents a methylene group, an alkylene group having 2 to 20 carbon atoms, or an alkylidene group having 2 to 20 carbon atoms, $R^{20}$ represents a hydrogen atom or a monovalent organic group having one or more carbon atoms, and x represents an integer from 1 to 500.

The mass ratio of the amino acid block (A) and the conjugated diene block (B) included in the block copolymer according to the present invention is normally (A):(B)=95:5 to 10:90, and preferably (A):(B)=70:30 to 40:60. If the mass ratio of the amino acid block (A) and the conjugated diene block (B) is outside the above range, biocompatibility may decrease. If the content of the amino acid block (A) is too high, the block copolymer may become resinous, and may exhibit insufficient elongation and low physical strength. The mass ratio of the amino acid block (A) and the conjugated diene block (B) can be easily designed by adjusting the molar ratio of the raw materials.

The weight average molecular weight (Mw) of the block copolymer according to the present invention is normally 5000 to 150,000, and preferably 10,000 to 50,000. The molecular weight distribution (Mw/Mn) of the block copolymer is normally 1.0 to 3.0, and preferably 1.0 to 1.6. The weight average molecular weight (Mw) of the block copolymer can be easily adjusted by controlling the reaction temperature and the like. The molecular weight distribution (Mw/Mn) can be easily adjusted by controlling the mass ratio of the raw material and the solvent, or changing the reaction temperature stepwise, for example.

The storage stability of the block copolymer according to the present invention is improved by adding 2,6-di-tert-butyl-p-cresol or the like that is effective for preventing oxidation of the diene site as an antioxidant. Therefore, that is preferable. The antioxidant is normally added in an amount of 0.4 to 0.6 mass % based on the total mass of the block copolymer.

(Molding of Block Copolymer)

The block copolymer according to the present invention may be molded by a solution casting method, an extrusion method, a calendaring method, or the like. Note that the molding method is not limited thereto. When molding the block copolymer with heating, a deterioration in properties due to heating can be suppressed by adding a heat stabilizer such as an aging preventive.

(Film Formation Using Block Copolymer)

The block copolymer according to the present invention may be formed into a film by a solution casting method or the like. Note that the film formation method is not limited thereto. A solvent used to prepare a block copolymer solution used when forming a film by the solution casting method is not particularly limited insofar as the block copolymer can be dissolved. It is preferable to use a good solvent for polydienes that allows the amino acid block (A) to have an α-helix structure. Specific examples of such a solvent include chloroform, methylene chloride, benzene, trifluoroethanol, dimethylformamide, and the like.

When using the solution casting method, the block copolymer solution is cast onto a plate made of glass, a metal, or the like, and the solvent is then removed. The concentration of the block copolymer solution cast onto the plate is normally 0.1 to 5 mass %. If the concentration of the block copolymer solution is higher than 5 mass %, it may be difficult to form a film having a uniform thickness, or operability may deteriorate. If the concentration of the block copolymer solution is lower than 0.1 mass %, it may be difficult to form a film having a sufficient thickness. The solvent removal method is not particularly limited, but the solvent is normally volatilized at room temperature, followed by sufficient drying under reduced pressure.

A film obtained by the solution casting method or the like using the block copolymer exhibits excellent biocompatibility and flexibility. Therefore, the block copolymer according to the present invention is suitable as a material for forming a medical instrument that comes in contact with a living body such as a wound dressing such as a plaster; a catheter such as a colono-feeding tube or a high-calorie infusion catheter; an extracorporal circulation circuit such as an oxygenator; a prosthesis; and an artificial blood vessel.

EXAMPLES

The present invention is further described below by way of examples. Note that the present invention is not limited to the following examples. In the examples and comparative examples, the unit "parts" refers to "parts by mass", and the unit "%" refers to "mass %", unless otherwise indicated. The reagents, the property value measuring methods, and the property evaluation methods used in the examples are given below.

Organolithium compound: A sec-butyllithium (s-BuLi) cyclohexane solution (1.3 mol/l), of which the effective lithium concentration was calculated to be 1.1 mol/l by the double titration method (Gilman. H. et al., J. Am. Chem. Soc., 66, pp. 1515-1516 (1944)), was used.

1,4-Bond content, 1,2-bond content, 3,4-bond content, number average molecular weight (Mn), and modification rate: A measurement specimen obtained by dissolving 100 mg of the dry amino group-containing conjugated diene polymer in 0.75 ml of chloroform-d was analyzed using a 500 MHz nuclear magnetic resonance spectroscopic analyzer ("ECX-500" manufactured by JEOL Ltd.) to determine the 1,4-bond content (%), the 1,2-bond content (%), the 3,4-bond content (%), the number average molecular weight (Mn (g/mol)), and the primary amino group introduction rate (modification rate (%)).

The number average molecular weight (Mn) was calculated from the integral ratio of a signal attributed to the aromatic C—H bond of the reaction product (a) and a signal attributed to the unsaturated C—H bond of polyisoprene. In Examples 1 to 3, Comparative Example 1, and Synthesis Examples 1 to 4, the primary amino group introduction rate was calculated from the integral ratio of a signal attributed to the aromatic C—H bond of the reaction product (a) and a signal attributed to the aromatic C—H bond of the end-modification group. In Examples 4 to 6, 29, 30, and 36 and Comparative Example 4, the primary amino group introduction rate was calculated from the integral ratio of a signal attributed to the aromatic C—H bond of the reaction product (a) and a signal attributed to the methyl group bonded to Si of the deprotected end-modification group. The 1,4-bond content, the 1,2-bond content, and the 3,4-bond content were calculated from the integral ratio of a signal attributed to the unsaturated C—H bond of polyisoprene and a signal attributed to each structure.

Molecular weight distribution (Mw/Mn): The polystyrene-reduced weight average molecular weight (Mw) and the polystyrene-reduced number average molecular weight (Mn) were measured at 40° C. by gel permeation chromatography (GPC) (column: "HLC-8120" manufactured by Tosoh Finechem Corporation) using tetrahydrofuran as a solvent. The molecular weight distribution (Mw/Mn) was calculated from the measured weight average molecular weight (Mw) and number average molecular weight (Mn).

Tensile test: A solution prepared by dissolving 3 parts of the block copolymer in 100 parts of chloroform was cast onto a glass plate. After volatilizing chloroform at room temperature, the block copolymer was sufficiently dried under reduced pressure to obtain a film having a thickness of about 30 μm. A tensile test was performed in accordance with JIS K-7113-1981 using the resulting film to measure the tensile strength (MPa) and the elongation (%).

Infrared spectral measurement: The infrared spectrum was measured using an instrument "FT-720" (manufactured by Horiba Ltd.).

Elemental analysis: An elemental analysis was performed using an instrument "JM10" (manufactured by J-Science Lab Co., Ltd.).

Reference Example 1

A glass reaction vessel (internal volume: 300 ml) was charged with a solution prepared by dissolving 3.00 g of 1,3-bis(diphenylethenyl)benzene (DPEB) in 100 ml of a dehydrated cyclohexane/heptane mixed solvent. After the addition of 18.5 ml of a sec-butyllithium (s-BuLi) cyclohexane solution (1.3 mol/l) in a dry nitrogen atmosphere, the mixture was stirred at 50° C. for 3 hours to prepare an initiator solution (1).

Comparative Reference Example 1

An initiator solution (2) was prepared in the same manner as in Reference Example 1, except for using 1.68 g of 1,3-diisopropenylbenzene (DIPB) instead of DPEB.

Example 1

A pressure-resistant glass reaction vessel (internal volume: 500 ml) was charged with 323 ml of a dehydrated cyclohexane/heptane mixed solvent and 9.12 ml of tetrahydrofuran. A few drops of the initiator solution (1) prepared in Reference Example 1 was added to the mixture in a dry nitrogen atmosphere. After confirming that the reaction solution became yellow, 13.8 ml of the initiator solution (1) and 36.0 g of dehydrated isoprene were added to the mixture. The mixture was then shaken at 50° C. for 30 minutes to effect a polymerization reaction. After the addition of 0.49 g of N-(trimethylsilyl)benzaldimine (modifier) to the reaction solution, the mixture was shaken at 75° C. or more for 3 hours to effect a modification reaction. The modification reaction was terminated by adding 2 ml of methanol. After collecting and concentrating the supernatant liquid after completion of the reaction, a reprecipitation operation using 50 ml of cyclohexane and 200 ml of methanol was repeated three times. The pH of the solution was adjusted to 1 using 2.2 g of concentrated hydrochloric acid in a mixed solvent of 100 ml of cyclohexane and 100 ml of methanol. The solution was then stirred at room temperature for 3 hours, and neutralized using 5.8 g of a sodium hydroxide aqueous solution (4.0 mol/l). The polymer was then precipitated using 500 ml of methanol. After repeating a reprecipitation operation using 50 ml of cyclohexane and 200 ml of methanol five times, the solvent was evaporated under reduced pressure. The polymer was then sufficiently dried at 60° C. under vacuum to obtain 28.7 g of polyisoprene (amino group-containing polyisoprene) including a primary amino group at each end. The resulting amino group-containing polyisoprene had an Mw/Mn of 1.22, an Mn of 37,000, an isoprene unit count of 534, and a modification rate of 91%. The amino group-containing polyisoprene had a 1,4-bond content of 32%, a 1,2-bond content of 7%, and a 3,4-bond content of 61% among all isoprene unit to isoprene unit bonding.

Example 2

29.2 g of an amino group-containing polyisoprene was obtained in the same manner as in Example 1, except for using 285 ml of the cyclohexane/heptane mixed solvent, 51.7 ml of the initiator solution (1), and 2.0 g of N-(trimethylsilyl)benzaldimine. Table 1 shows the measurement results for the property values of the resulting amino group-containing polyisoprene.

Comparative Example 1

32.5 g of an amino group-containing polyisoprene was obtained in the same manner as in Example 1, except for using the initiator solution (2) prepared in Comparative Reference Example 1 instead of the initiator solution (1). Table 1 shows the measurement results for the property values of the resulting amino group-containing polyisoprene. The resulting amino group-containing polyisoprene was analyzed by gel permeation chromatography to confirm peaks considered to be attributed to a dimer and a trimer.

Example 3

30.8 g of an amino group-containing polybutadiene was obtained in the same manner as in Example 1, except for using 36.0 g of butadiene instead of isoprene, and using 318 ml of the cyclohexane/heptane mixed solvent, 19.3 ml of the initiator solution (1), and 0.75 g of N-(trimethylsilyl)benzaldimine. Table 1 shows the measurement results for the property values of the resulting amino group-containing polybutadiene.

Example 4

30.8 g of an amino group-containing polybutadiene was obtained in the same manner as in Example 3, except for using 1.23 g of N,N-bis(trimethylsilyl)-3-aminopropyldimethylmethoxysilane instead of N-(trimethylsilyl)benzaldimine. Table 1 shows the measurement results for the property values of the resulting amino group-containing polybutadiene.

Example 5

29.3 g of an amino group-containing polybutadiene was obtained in the same manner as in Example 3, except for using 1.25 g of N,N-bis(trimethylsilyl)-3-aminopropyldimethylchlorosilane instead of N-(trimethylsilyl)benzaldimine. Table 1 shows the measurement results for the property values of the resulting amino group-containing polybutadiene.

Example 6

29.5 g of an amino group-containing polybutadiene was obtained in the same manner as in Example 3, except for using 1.25 g of 3-(2,2,5,5-tetramethyl-1-aza-2,5-disilacyclopentyl)propyldimethylmethoxysilane instead of N-(trimethylsilyl)benzaldimine. Table 1 shows the measurement results for the property values of the resulting amino group-containing polybutadiene.

TABLE 1

| | Compound (1) | Organo-lithium compound | Modifier | Conjugated diene compound | Mn (−1000) | Number of conjugated diene compound units |
|---|---|---|---|---|---|---|
| Example 1 | DPEB*[1] | s-BuLi | A | Isoprene | 37 | 534 |
| Example 2 | DPEB*[1] | s-BuLi | A | Isoprene | 9.2 | 127 |
| Comparative Example 1 | DIPB*[2] | s-BuLi | A | Isoprene | 45 | 660 |
| Example 3 | DPEB*[1] | s-BuLi | A | Butadiene | 24 | 444 |
| Example 4 | DPEB*[1] | s-BuLi | B | Butadiene | 22 | 407 |
| Example 5 | DPEB*[1] | s-BuLi | C | Butadiene | 25 | 462 |
| Example 6 | DPEB*[1] | s-BuLi | D | Butadiene | 22 | 407 |

| | Compound (1) | Mw/Mn | Microstructure (bond content (%)) | | | Modification rate (%) | Yield (g) | Yield (%) |
|---|---|---|---|---|---|---|---|---|
| | | | 1,4-bond | 1,2-bond | 3,4-bond | | | |
| Example 1 | DPEB*[1] | 1.22 | 32 | 7 | 61 | 91 | 28.7 | 78.0 |
| Example 2 | DPEB*[1] | 1.45 | 34 | 6 | 60 | 86 | 29.2 | 74.9 |
| Comparative Example 1 | DIPB*[2] | 3.01 | 31 | 7 | 62 | 60 | 32.5 | 88.9 |
| Example 3 | DPEB*[1] | 1.15 | 28 | 72 | — | 96 | 30.8 | 83.0 |
| Example 4 | DPEB*[1] | 1.19 | 28 | 72 | — | 92 | 29.3 | 78.7 |
| Example 5 | DPEB*[1] | 1.17 | 27 | 73 | — | 89 | 29.3 | 78.9 |
| Example 6 | DPEB*[1] | 1.15 | 29 | 71 | — | 91 | 29.5 | 79.4 |

*[1]1,3-Bis(diphenylethenyl)benzene
*[2]1,3-Diisopropenylbenzene

Table 2 shows the chemical name corresponding to the symbol (A to D) of the modifier shown in Table 1.

TABLE 2

| Modifier | Chemical name |
|---|---|
| A | N-(Trimethylsilyl)benzaldimine |
| B | N,N-Bis(trimethylsilyl)-3-aminopropyldimethylchlorosilane |
| C | N,N-Bis(trimethylsilyl)-3-aminopropyldimethylmethoxysilane |
| D | 3-(2,2,5,5-Tetramethyl-1-aza-2,5-disilacyclopentyl)-propyldimethylmethoxysilane |

Example 7

3700 mg (0.1 mmol) of the amino group-containing polyisoprene obtained in Example 1 and 2630 mg (10 mmol) of γ-benzyl L-glutamate N-carboxyamino acid anhydride (BLG-NCA) were added to 40 g of dichloromethane. The components were polymerized at 25° C. for 8 hours. A precipitate produced by adding the reaction solution to 1 l of methanol was sufficiently dried at room temperature under reduced pressure to obtain a dry material. A solution prepared by dissolving the dry material in dichloromethane was added to 1 l of hexane to produce a precipitate (reprecipitation treatment). The precipitate was sufficiently dried at room temperature under reduced pressure to obtain 3.7 g of a block copolymer. The resulting block copolymer had a tensile strength of 11.0 MPa and an elongation of 512%.

Example 8

14.8 mg of an antioxidant (2,6-di-tert-butyl-p-cresol) was added to 3.7 g of the block copolymer obtained in Example 7 to obtain a block copolymer. Table 3 shows the measurement results for the tensile strength and the elongation of the resulting block copolymer.

Example 9

2.0 g of a block copolymer was obtained in the same manner as in Example 7, except for using 920 mg (0.1 mmol) of the amino group-containing polyisoprene obtained in Example 2 instead of the amino group-containing polyisoprene obtained in Example 1. Table 3 shows the measurement results for the tensile strength and the elongation of the resulting block copolymer.

Comparative Example 2

4.0 g of a block copolymer was obtained in the same manner as in Example 7, except for using 4500 mg (0.1 mmol) of the amino group-containing polyisoprene obtained in Comparative Example 1 instead of the amino group-containing polyisoprene obtained in Example 1. Table 3 shows the measurement results for the tensile strength and the elongation of the resulting block copolymer.

Example 10

2.9 g of a block copolymer was obtained in the same manner as in Example 7, except for using 2400 mg (0.1 mmol) of the amino group-containing polybutadiene obtained in Example 3 instead of the amino group-containing polyisoprene obtained in Example 1. Table 3 shows the measurement results for the tensile strength and the elongation of the resulting block copolymer.

Example 11

2.7 g of a block copolymer was obtained in the same manner as in Example 7, except for using 2200 mg (0.1 mmol) of the amino group-containing polybutadiene obtained in Example 4 instead of the amino group-containing polyisoprene obtained in Example 1. Table 3 shows the measurement results for the tensile strength and the elongation of the resulting block copolymer.

Example 12

2.9 g of a block copolymer was obtained in the same manner as in Example 7, except for using 2500 mg (0.1 mmol) of the amino group-containing polybutadiene obtained in Example 5 instead of the amino group-containing polyisoprene obtained in Example 1. Table 3 shows the measurement results for the tensile strength and the elongation of the resulting block copolymer.

Example 13

2.8 g of a block copolymer was obtained in the same manner as in Example 7, except for using 2200 mg (0.1 mmol) of the amino group-containing polybutadiene obtained in Example 6 instead of the amino group-containing polyisoprene obtained in Example 1. Table 3 shows the measurement results for the tensile strength and the elongation of the resulting block copolymer.

TABLE 3

| | Amino group-containing conjugated diene polymer | Antioxidant[*2] | Properties of block copolymer (M/I = 100[*1]) | | | |
|---|---|---|---|---|---|---|
| | | | Tensile strength (MPa) | Elongation (%) | Yield (g) | Yield (%) |
| Example 7 | Example 1 | Not added | 11.0 | 512 | 3.7 | 62.8 |
| Example 8 | Example 1 | Added | 11.1 | 521 | 3.7 | 62.8 |
| Example 9 | Example 2 | Not added | 21.7 | 154 | 2.0 | 65.0 |
| Comparative Example 2 | Comparative Example 1 | Not added | 5.7 | 214 | 4.0 | 60.5 |
| Example 10 | Example 3 | Not added | 10.1 | 402 | 2.4 | 64.0 |
| Example 11 | Example 4 | Not added | 9.5 | 386 | 2.7 | 61.5 |
| Example 12 | Example 5 | Not added | 10.5 | 378 | 2.9 | 62.5 |
| Example 13 | Example 6 | Not added | 9.8 | 380 | 2.8 | 63.4 |

[*1]Molar ratio of monomer (M) to initiator (I)
[*2]2,6-Di-tert-butyl-p-cresol

Example 14

3700 mg (0.1 mmol) of the amino group-containing polyisoprene obtained in Example 1 and 4025 mg (10 mmol) of N-(4-nitrophenoxycarbonyl)-γ-benzyl L-glutamate (Np-BLG) were added to 40 g of dichloromethane. The components were polymerized at 25° C. for 8 hours. A precipitate produced by adding the reaction solution to 1 l of methanol was sufficiently dried at room temperature under reduced pressure to obtain a dry material. A solution prepared by dissolving the dry material in dichloromethane was added to 1 l of hexane to produce a precipitate (reprecipitation treatment). The precipitate was sufficiently dried at room temperature under reduced pressure to obtain 3.6 g of a block copolymer. The resulting block copolymer had a tensile strength of 10.5 MPa and an elongation of 509%.

Example 15

2.0 g of a block copolymer was obtained in the same manner as in Example 14, except for using 920 mg (0.1 mmol) of the amino group-containing polyisoprene obtained in Example 2 instead of the amino group-containing polyisoprene obtained in Example 1. Table 4 shows the measurement results for the tensile strength and the elongation of the resulting block copolymer.

Comparative Example 3

4.1 g of a block copolymer was obtained in the same manner as in Example 13, except for using 4500 mg (0.1 mmol) of the amino group-containing polyisoprene obtained in Comparative Example 1 instead of the amino group-containing polyisoprene obtained in Example 1. Table 4 shows the measurement results for the tensile strength and the elongation of the resulting block copolymer.

Example 16

2.9 g of a block copolymer was obtained in the same manner as in Example 14, except for using 2400 mg (0.1 mmol) of the amino group-containing polybutadiene obtained in Example 3 instead of the amino group-containing polyisoprene obtained in Example 1. Table 4 shows the measurement results for the tensile strength and the elongation of the resulting block copolymer.

Example 17

2.8 g of a block copolymer was obtained in the same manner as in Example 14, except for using 2200 mg (0.1 mmol) of the amino group-containing polybutadiene obtained in Example 4 instead of the amino group-containing polyisoprene obtained in Example 1. Table 4 shows the measurement results for the tensile strength and the elongation of the resulting block copolymer.

Example 18

2.9 g of a block copolymer was obtained in the same manner as in Example 14, except for using 2500 mg (0.1 mmol) of the amino group-containing polybutadiene obtained in Example 5 instead of the amino group-containing polyisoprene obtained in Example 1. Table 4 shows the measurement results for the tensile strength and the elongation of the resulting block copolymer.

Example 19

2.8 g of a block copolymer was obtained in the same manner as in Example 14, except for using 2200 mg (0.1 mmol) of the amino group-containing polybutadiene obtained in Example 6 instead of the amino group-containing polyisoprene obtained in Example 1. Table 4 shows the measurement results for the tensile strength and the elongation of the resulting block copolymer.

TABLE 4

| | Amino group-containing conjugated diene polymer | Properties of block copolymer (M/I = 100*[1]) | | | |
|---|---|---|---|---|---|
| | | Tensile strength (MPa) | Elongation (%) | Yield (g) | Yield (%) |
| Example 14 | Example 1 | 10.5 | 509 | 3.6 | 61.0 |
| Example 15 | Example 2 | 21.0 | 164 | 2.0 | 64.0 |
| Comparative Example 3 | Comparative Example 1 | 6.1 | 209 | 4.1 | 61.9 |
| Example 16 | Example 3 | 9.8 | 395 | 2.9 | 63.4 |
| Example 17 | Example 4 | 10.0 | 378 | 2.8 | 63.0 |
| Example 18 | Example 5 | 9.4 | 382 | 2.9 | 60.8 |
| Example 19 | Example 6 | 10.2 | 400 | 2.8 | 63.2 |

*[1]Molar ratio of monomer (M) to initiator (I)

Synthesis Example 1

A glass reaction vessel (internal volume: 300 ml) was charged with 3.0 g of 1,3-bis(diphenylethenyl)benzene and 100 ml of a dehydrated cyclohexane/heptane mixed solvent. 18.5 ml of a sec-butyllithium cyclohexane solution (1.3 mol/l) was then added to the mixture. The mixture was stirred for 3 hours to prepare an anionic initiator solution.

A pressure-resistant glass reaction vessel (internal volume: 500 ml) was charged with 285 ml of a dehydrated cyclohexane/heptane mixed solvent and 9.12 ml of tetrahydrofuran. After the addition of 0.1 ml of the anionic initiator solution, a small amount of water contained in the solvent was removed. 51.7 ml of the anionic initiator solution was then added to the mixture. After the reaction solution became reddish brown, 36.0 g of dehydrated isoprene was added to the mixture. The mixture was shaken at 50° C. for 30 minutes to effect polymerization. After the addition of 2.0 g of N-(trimethylsilyl) benzaldimine to the reaction solution, the mixture was shaken at 75° C. or more for 3 hours to introduce a protected amino group into each end of polyisoprene. The color of the reaction solution changed from dark red to green upon addition of 2 ml of deaerated methanol. This indicated that the system was inactivated. After concentrating the supernatant liquid after the reaction, a reprecipitation operation was performed several times using cyclohexane and methanol. The pH of the solution was then adjusted to 1 using concentrated hydrochloric acid. The solution was then stirred at room temperature for 3 hours to desilylate the protected amino group at each end of the polyisoprene. The solution was then neutralized using a sodium hydroxide aqueous solution, and a reprecipitation operation was repeated several times using cyclohexane and methanol to effect purification. After evaporating the solvent under reduced pressure, the polymer was sufficiently dried at 60° C. to obtain 29.2 g of polyisoprene (polyisoprene (1)) including an amino group at each end.

The polyisoprene (1) had a molecular weight distribution (Mw/Mn) of 1.45. The number average molecular weight (Mn) of the polyisoprene (1) measured by nuclear magnetic resonance spectroscopic analysis was 9200 g/mol. It was found that the polyisoprene (1) included 127 isoprene units. The average modification rate (amino group introduction rate) of the polyisoprene (1) was 86%. The polyisoprene (1) had a 1,4-bond content of 34%, a 1,2-bond content of 6%, and a 3,4-bond content of 60%.

Synthesis Example 2

32.7 g of polyisoprene (polyisoprene (2)) including an amino group at each end was obtained in the same manner as in Synthesis Example 1, except for using 219 ml of the cyclohexane/heptane mixed solvent, 118.1 ml of the anionic initiator solution, and 4.56 g of N-(trimethylsilyl)benzaldimine.

The polyisoprene (2) had a molecular weight distribution (Mw/Mn) of 1.65. The number average molecular weight (Mn) of the polyisoprene (2) measured by nuclear magnetic resonance spectroscopic analysis was 4600 g/mol. It was found that the polyisoprene (2) included 534 isoprene units. The average modification rate (amino group introduction rate) of the polyisoprene (2) was 91%. The polyisoprene (2) had a 1,4-bond content of 32%, a 1,2-bond content of 7%, and a 3,4-bond content of 61%.

Synthesis Example 3

20.2 g of polyisoprene (polyisoprene (3)) including an amino group at each end was obtained in the same manner as in Synthesis Example 1, except for using 130 ml of the cyclohexane/heptane mixed solvent, 206.6 ml of the anionic initiator solution, and 7.98 g of N-(trimethylsilyl)benzaldimine.

The polyisoprene (3) had a molecular weight distribution (Mw/Mn) of 1.62. The number average molecular weight (Mn) of the polyisoprene (3) measured by nuclear magnetic resonance spectroscopic analysis was 2900 g/mol. It was found that the polyisoprene (3) included 42 isoprene units. The average modification rate (amino group introduction rate) of the polyisoprene (3) was 93%. The polyisoprene (3) had a 1,4-bond content of 34%, a 1,2-bond content of 7%, and a 3,4-bond content of 59%.

Synthesis Example 4

30.8 g of polybutadiene (polybutadiene) including an amino group at each end was obtained in the same manner as in Synthesis Example 1, except for using 36.0 g of butadiene instead of isoprene.

The polybutadiene had a molecular weight distribution (Mw/Mn) of 1.15. The number average molecular weight (Mn) of the polybutadiene measured by nuclear magnetic resonance spectroscopic analysis was 9200 g/mol. It was found that the polybutadiene included 684 isoprene units. The average modification rate (amino group introduction rate) of the polybutadiene was 90%. The polybutadiene had a 1,4-bond content of 37% and a 1,2-bond content of 63%.

TABLE 5

| | Conjugated diene compound | Conjugated diene polymer | Microstructure (bond content (%)) | | | Number average molecular weight (g/mol) | Molecular weight distribution (Mw/Mn) | Modification rate (%) |
|---|---|---|---|---|---|---|---|---|
| | | | 1,4-bond | 1,2-bond | 3,4-bond | | | |
| Synthesis Example 1 | Isoprene | Polyisoprene (1) | 34 | 6 | 60 | 9200 | 1.45 | 86 |
| Synthesis Example 2 | Isoprene | Polyisoprene (2) | 32 | 7 | 61 | 4600 | 1.65 | 91 |

TABLE 5-continued

| | Conjugated diene compound | Conjugated diene polymer | Microstructure (bond content (%)) | | | Number average molecular weight (g/mol) | Molecular weight distribution (Mw/Mn) | Modification rate (%) |
|---|---|---|---|---|---|---|---|---|
| | | | 1,4-bond | 1,2-bond | 3,4-bond | | | |
| Synthesis Example 3 | Isoprene | Polyisoprene (3) | 34 | 7 | 59 | 2900 | 1.62 | 93 |
| Synthesis Example 4 | Butadiene | Polybutadiene | 37 | 63 | — | 9200 | 1.15 | 90 |

Example 20

A 300 ml round-bottomed flask equipped with a Dimroth condenser was charged with 23.73 g (100 mmol) of γ-benzyl L-glutamate, 20.16 g (100 mmol) of 4-nitrophenyl chloroformate, and 200 ml of ethyl acetate under a nitrogen atmosphere. The mixture was stirred at 45° C. for 24 hours. The reaction solution was then added to a separating funnel (1 l), washed three times with distilled water and washed three times with a saturated sodium chloride aqueous solution. The organic layer was then isolated and dehydrated for 1 hour over anhydrous magnesium sulfate. Magnesium sulfate was then filtered off using filter paper. After evaporating the solvent from the filtrate under reduced pressure, the residue was recrystallized from ethyl acetate/n-hexane (2/5 (v/v)). The resulting crystal was dried at room temperature under vacuum to obtain 14.1 g of N-(4-nitrophenoxycarbonyl)-γ-benzyl L-glutamate.

4025 mg of N-(4-nitrophenoxycarbonyl)-γ-benzyl L-glutamate was added to 10 g of a solution prepared by dissolving 920 mg of the polyisoprene (1) obtained in Synthesis Example 1 in a mixture of 1 part of dimethylacetamide and 1 part of cyclohexane. The components were polymerized at 60° C. for 8 hours. The mixed solution was added to 1 l of methanol to produce a precipitate. The solution was centrifuged at room temperature for 10 minutes at a rotational speed of 3500 rpm to obtain a crude product. The crude product was sufficiently dried at room temperature under reduced pressure, dissolved in dichloromethane, and precipitated in 1 l of hexane. The product was removed by centrifugation (room temperature, 3,500 rpm, 10 minutes), and sufficiently dried at room temperature under reduced pressure to obtain 2.0 g of a poly(γ-benzyl L-glutamate)-polyisoprene block copolymer.

The resulting poly(γ-benzyl L-glutamate)-polyisoprene block copolymer was subjected to elemental analysis, infrared spectral measurement, and the tensile strength test. The mass ratio of poly(γ-benzyl L-glutamate) and polyisoprene in the poly(γ-benzyl L-glutamate)-polyisoprene block copolymer determined by elemental analysis was 79.4/20.6. It was confirmed by infrared spectroscopy that the poly(γ-benzyl L-glutamate) block in the poly(γ-benzyl L-glutamate)-polyisoprene block copolymer had an α-helix structure. The results for the tensile strength test are shown in Table 7.

Example 21

1.87 g of a poly(γ-benzyl L-glutamate)-polyisoprene block copolymer was obtained in the same manner as in Example 20, except for using 460 mg of the polyisoprene (2) obtained in Synthesis Example 2.

The resulting poly(γ-benzyl L-glutamate)-polyisoprene block copolymer was subjected to elemental analysis, infrared spectral measurement, and the tensile strength test. The mass ratio of poly(γ-benzyl L-glutamate) and polyisoprene in the poly(γ-benzyl L-glutamate)-polyisoprene block copolymer determined by elemental analysis was 88.4/11.6. It was confirmed by infrared spectroscopy that the poly(γ-benzyl L-glutamate) block in the poly(γ-benzyl L-glutamate)-polyisoprene block copolymer had an α-helix structure. The results for the tensile strength test are shown in Table 7.

Example 22

2.3 g of a poly(γ-benzyl L-glutamate)-polyisoprene block copolymer was obtained in the same manner as in Example 20, except for using 290 mg of the polyisoprene (3) obtained in Synthesis Example 3.

The resulting poly(γ-benzyl L-glutamate)-polyisoprene block copolymer was subjected to elemental analysis, infrared spectral measurement, and the tensile strength test. The mass ratio of poly(γ-benzyl L-glutamate) and polyisoprene in the poly(γ-benzyl L-glutamate)-polyisoprene block copolymer determined by elemental analysis was 90.2/9.8. It was confirmed by infrared spectroscopy that the poly(γ-benzyl L-glutamate) block in the poly(γ-benzyl L-glutamate)-polyisoprene block copolymer had an α-helix structure. The results for the tensile strength test are shown in Table 7.

Example 23

2.13 g of a poly(γ-benzyl L-glutamate)-polybutadiene block copolymer was obtained in the same manner as in Example 20, except for using 920 mg of the polybutadiene obtained in Synthesis Example 4.

The resulting poly(γ-benzyl L-glutamate)-polybutadiene block copolymer was subjected to elemental analysis, infrared spectral measurement, and the tensile test. The mass ratio of poly(γ-benzyl L-glutamate) and polybutadiene in the poly(γ-benzyl L-glutamate)-polybutadiene block copolymer determined by elemental analysis was 83.4/16.6. It was confirmed by infrared spectroscopy that the poly(γ-benzyl L-glutamate) block in the poly(γ-benzyl L-glutamate)-polybutadiene block copolymer had an α-helix structure. The results for the tensile strength test are shown in Table 7.

Example 24

A 300 ml round-bottomed flask equipped with a Dimroth condenser was charged with 23.73 g (100 mmol) of γ-benzyl L-glutamate and 100 ml of tetrahydrofuran under a nitrogen atmosphere. After the addition of 39.4 g (100 mmol) of bis (pentafluorophenyl) carbonate, the mixture was stirred at 60° C. for 40 hours. After evaporating the solvent under reduced pressure, the residue was purified by column chromatography to obtain 20.1 g of N-(pentafluorophenoxycarbonyl)-γ-benzyl L-glutamate.

1.49 g of a poly(γ-benzyl L-glutamate)-polyisoprene block copolymer was obtained in the same manner as in Example 20, except for using 2965 mg of N-(pentafluorophenoxycarbonyl)-γ-benzyl L-glutamate instead of 4025 mg of N-(4-nitrophenoxycarbonyl)-γ-benzyl L-glutamate.

The resulting poly(γ-benzyl L-glutamate)-polyisoprene block copolymer was subjected to elemental analysis, infrared spectral measurement, and the tensile strength test. The mass ratio of poly(γ-benzyl L-glutamate) and polyisoprene in the poly(γ-benzyl L-glutamate)-polyisoprene block copolymer determined by elemental analysis was 76.2/23.8. It was confirmed by infrared spectroscopy that the poly(γ-benzyl L-glutamate) block in the poly(γ-benzyl L-glutamate)-polyisoprene block copolymer had an α-helix structure. The results for the tensile strength test are shown in Table 7.

Example 25

A 300 ml rund-bottomed flask equipped with a Dimroth condenser was charged with 23.73 g (100 mmol) of γ-benzyl L-glutamate and 1000 ml of tetrahydrofuran under a nitrogen atmosphere. After the addition of 25.6 g (100 mmol) of bis(succinimidyl) carbonate, the mixture was stirred at 60° C. for 2 hours. After evaporating the solvent under reduced pressure, the residue was purified by column chromatography to obtain 34.1 g of N-(succinimidyloxycarbonyl)-γ-benzyl L-glutamate.

1.52 g of a poly(γ-benzyl L-glutamate)-polyisoprene block copolymer was obtained in the same manner as in Example 20, except for using 3785 mg of N-(succinimidyloxycarbonyl)-γ-benzyl L-glutamate instead of 4025 mg of N-(4-nitrophenoxycarbonyl)-γ-benzyl L-glutamate.

The resulting poly(γ-benzyl L-glutamate)-polyisoprene block copolymer was subjected to elemental analysis, infrared spectral measurement, and the tensile strength test. The mass ratio of poly(γ-benzyl L-glutamate) and polyisoprene in the poly(γ-benzyl L-glutamate)-polyisoprene block copolymer determined by elemental analysis was 75.8/24.2. It was confirmed by infrared spectroscopy that the poly(γ-benzyl L-glutamate) block in the poly(γ-benzyl L-glutamate)-polyisoprene block copolymer had an α-helix structure. The results for the tensile strength test are shown in Table 7.

Example 26

15.9 g of N-(4-nitrophenoxycarbonyl)-L-phenylalanine was obtained in the same manner as in Example 1, except for using 16.53 g (100 mmol) of L-phenylalanine instead of 23.73 g (100 mmol) of γ-benzyl L-glutamate.

1.62 g of a poly(L-phenylalanine)-polyisoprene block copolymer was obtained in the same manner as in Example 20, except for using 3305 mg of N-(4-nitrophenoxycarbonyl)-L-phenylalanine instead of 4025 mg of N-(4-nitrophenoxycarbonyl)-γ-benzyl L-glutamate.

The resulting poly(L-phenylalanine)-polyisoprene block copolymer was subjected to elemental analysis, infrared spectral measurement, and the tensile strength test. The mass ratio of poly(L-phenylalanine) and polyisoprene in the poly(L-phenylalanine)-polyisoprene block copolymer determined by elemental analysis was 85.0/15.0. It was confirmed by infrared spectroscopy that the poly(L-phenylalanine) block in the poly(L-phenylalanine)-polyisoprene block copolymer had an α-helix structure. The results for the tensile strength test are shown in Table 7.

Example 27

A 300 ml round-bottomed flask equipped with a Dimroth condenser was charged with 22.33 g (100 mmol) of β-benzyl L-aspartate, 20.16 g (100 mmol) of 4-nitrophenyl chloroformate, and 200 ml of ethyl acetate under a nitrogen atmosphere. The mixture was stirred at 45° C. for 24 hours. The reaction solution was then added to a separating funnel (1 l), washed three times with distilled water and washed three times with a saturated sodium chloride aqueous solution. The organic layer was then isolated and dehydrated for 1 hour over anhydrous magnesium sulfate. Magnesium sulfate was then filtered off using filter paper, and the solvent was evaporated from the filtrate under reduced pressure. The residue was dissolved in chloroform, and purified by column chromatography (eluant: chloroform/acetone=9/1 (v/v)) to obtain 10.8 g of N-(4-nitrophenoxycarbonyl)-β-benzyl L-aspartate.

1.71 g of a poly(β-benzyl L-aspartate)-polyisoprene block copolymer was obtained in the same manner as in Example 20, except for using 3885 mg of N-(4-nitrophenoxycarbonyl)-β-benzyl L-aspartate instead of 4025 mg of N-(4-nitrophenoxycarbonyl)-γ-benzyl L-glutamate.

The resulting poly(β-benzyl L-aspartate)-polyisoprene block copolymer was subjected to elemental analysis, infrared spectral measurement, and the tensile strength test. The mass ratio of poly(β-benzyl L-aspartate) and polyisoprene in the poly(β-benzyl L-aspartate)-polyisoprene block copolymer determined by elemental analysis was 80.3/19.7. It was confirmed by infrared spectroscopy that the poly(β-benzyl L-aspartate) block in the poly(β-benzyl L-aspartate)-polyisoprene block copolymer had an α-helix structure. The results for the tensile strength test are shown in Table 7.

Example 28

A 300 ml round-bottomed flask equipped with a Dimroth condenser was charged with 13.13 g (100 mmol) of L-isoleucine and 1000 ml of tetrahydrofuran. After the addition of 30.4 g (100 mmol) of bis(4-nitrophenyl) carbonate, the mixture was stirred at 60° C. for 20 hours. After evaporating the solvent, the residue was purified by column chromatography to obtain 8.3 g of N-(4-nitrophenoxycarbonyl)-L-isoleucine.

1.54 g of a poly(L-isoleucine)-polyisoprene block copolymer was obtained in the same manner as in Example 20, except for using 2965 mg of N-(4-nitrophenoxycarbonyl)-L-isoleucine instead of 4025 mg of N-(4-nitrophenoxycarbonyl)-γ-benzyl L-glutamate.

The resulting poly(L-isoleucine)-polyisoprene block copolymer was subjected to elemental analysis, infrared spectral measurement, and the tensile strength test. The mass ratio of poly(L-isoleucine) and polyisoprene in the poly(L-isoleucine)-polyisoprene block copolymer determined by elemental analysis was 88.1/11.9. It was confirmed by infrared spectroscopy that the poly(γ-benzyl L-glutamate) block in the poly(L-isoleucine)-polyisoprene block copolymer had an α-helix structure. The results for the tensile strength test are shown in Table 7.

TABLE 6

| | Conjugated diene polymer | Aromatic ring functional group ($R^{21}$) | Ammo acid or amino acid derivative | Reaction solvent | *2 | *3 | Molar ratio*4 | Reaction temperature (° C.) | Reaction time (h) |
|---|---|---|---|---|---|---|---|---|---|
| Example 20 | Polyisoprene(1) | 4-$NO_2$ | γ-Benzyl L-glulamate | DMF/ cyclohexane | 1 | 0.05 | 100 | 60 | 8 |
| Example 21 | Polyisoprene(2) | 4-$NO_2$ | γ-Benzyl L-glutamate | DMF/ cyclohexane | 1 | 0.01 | 100 | 60 | 8 |
| Example 22 | Polyisoprene(3) | 4-$NO_2$ | γ-Benzyl L-glutamate | DMF/ cyclohexane | 1 | 0.05 | 100 | 60 | 8 |
| Example 23 | Polybutadiene | 4-$NO_2$ | γ-Benzyl L-glutamate | DMF/ cyclohexane | 1 | 0.01 | 100 | 60 | 8 |
| Example 24 | Polyisoprene(1) | 4-$NO_2$ | γ-Benzyl L-glutamate | DMF/ cyclohexane | 1 | 0.01 | 100 | 60 | 8 |

TABLE 6-continued

| | Conjugated diene polymer | Aromatic ring functional group (R[21]) | Amino acid or amino acid derivative | Reaction solvent | *2 | *3 | Molar ratio*4 | Reaction temperature (° C.) | Reaction time (h) |
|---|---|---|---|---|---|---|---|---|---|
| Example 25 | Polyisoprene(1) | Succinimidyl*1 | γ-Benzyl L-glutamate | DMF/ cyclohexane | 1 | 0.01 | 100 | 60 | 8 |
| Example 26 | Polyisoprene(1) | 4-NO$_2$ | L-Phenylalanine | DMF/ cyclohexane | 1 | 0.01 | 100 | 60 | 8 |
| Example 27 | Polyisoprene(1) | 4-NO$_2$ | β-Benzyl L-aspartate | DMF/ cyclohexane | 1 | 0.01 | 100 | 60 | 8 |
| Example 28 | Polyisoprene(1) | 4-NO$_2$ | L-Isoleucine | DMF/ cyclohexane | 1 | 0.01 | 100 | 60 | 8 |

*1 Non-aromatic ring
*2 Concentration (mol/l) of amino acid derivative having carbamate structure
*3 Concentration (mol/l) of conjugated diene polymer
*4 Amino acid derivative having carbamate structure/conjugated diene polymer

TABLE 7

| | Yield of block copolymer (%) | Mass ratio (amino acid block (A)/conjugated diene block (B)) | Tensile strength (MPa) | Elongation (%) |
|---|---|---|---|---|
| Example 20 | 66 | 79.4/20.6 | 22.1 | 109.1 |
| Example 21 | 70 | 88.4/11.6 | 19.2 | 59.0 |
| Example 22 | 92 | 90.2/9.8 | 18.2 | 8.7 |
| Example 23 | 68 | 83.4/16.6 | 21.4 | 82.3 |
| Example 24 | 61 | 76.2/23.8 | 21.0 | 92.4 |
| Example 25 | 63 | 75.8/24.2 | 21.6 | 102.1 |
| Example 26 | 61 | 85.0/15.0 | 20.4 | 100.6 |
| Example 27 | 64 | 80.3/19.7 | 23.4 | 95.6 |
| Example 28 | 69 | 88.1/11.9 | 20.1 | 98.7 |

As shown in Table 7, it was confirmed that the desired block copolymer can be produced in medium to high yield even when using the amino acid derivative having a carbamate structure that is synthesized without using phosgene.

Synthesis Example 5

Preparation of Initiator Solution (Reaction Product (a))

A glass reaction vessel (internal volume: 300 ml) was charged with a solution prepared by dissolving 3.00 g of 1,3-di(1-phenylethenyl)benzene (DPEB) in 100 ml of a dehydrated cyclohexane/heptane mixed solvent. After the addition of 18.5 ml of a sec-butyllithium (s-BuLi) cyclohexane solution (effective lithium concentration: 1.1 mol/l) in a dry nitrogen atmosphere, the mixture was stirred at 50° C. for 3 hours to prepare an initiator solution a1. The lithium concentration in the initiator solution a1 was 0.17 mol/l.

Example 29

A pressure-resistant glass reaction vessel (internal volume: 500 ml) was charged with 332 ml of a dehydrated cyclohexane/heptane mixed solvent and 0.11 ml (0.601 mmol) of 2,2-di(tetrahydrofuryl)propane (BTHFP, specific gravity: 1.00 g/ml, FW: 184.27). A few drops of the initiator solution a1 prepared in Synthesis Example 5 was added to the mixture in a dry nitrogen atmosphere. After confirming that the reaction solution became yellow, 13.8 ml (Li content: 2.40 mmol) of the initiator solution a1 and 36.0 g of dehydrated isoprene were added to the mixture. The mixture was then shaken at 50° C. for 30 minutes to effect a polymerization reaction. After the addition of 0.98 g of N,N-bis(trimethylsilyl)-3-aminopropyldimethylmethoxysilane (modifier) to the reaction solution, the mixture was shaken at 75° C. or more for 3 hours to effect a modification reaction. The modification reaction was terminated by adding 2 ml of methanol.

After collecting and concentrating the supernatant liquid after completion of the modification reaction, a reprecipitation operation using 50 ml of cyclohexane and 200 ml of methanol was repeated three times. The pH of the solution was adjusted to 3 to 4 using 11.3 g of acetic acid in a mixed solvent of 100 ml of cyclohexane and 100 ml of methanol. The solution was then stirred at room temperature for 3 hours, and neutralized using 47.1 g of a sodium hydroxide aqueous solution (4.0 mol/l). The polymer was then precipitated using 500 ml of methanol. After repeating a reprecipitation operation using 50 ml of cyclohexane and 200 ml of methanol five times, the solvent was evaporated under reduced pressure. The polymer was then sufficiently dried at 60° C. under vacuum to obtain 31.0 g of polyisoprene (amino group-containing polyisoprene) including a primary amino group at each end. The resulting amino group-containing polyisoprene had a number average molecular weight (Mn) of 32,000, an isoprene unit count of 432, and a modification rate of 90%.

Example 30

30.5 g of an amino group-containing polyisoprene was obtained in the same manner as in Example 29, except for using 262 ml of the cyclohexane/heptane mixed solvent and 0.67 ml (3.65 mmol) of BTHFP, and adding 83.9 ml (Li content: 14.6 mmol) of the initiator solution a1 after confirming that the reaction solution became yellow. The resulting amino group-containing polyisoprene had a number average molecular weight (Mn) of 5400, an isoprene unit count of 79, and a modification rate of 86%.

Comparative Example 4

29.8 g of an amino group-containing polyisoprene was obtained in the same manner as in Example 29, except for using 323 ml of the cyclohexane/heptane mixed solvent, and adding 9.1 ml (112 mmol) of tetrahydrofuran (THF, specific gravity: 0.888 g/ml, FW: 72.11) instead of 0.11 ml of BTHFP. The resulting amino group-containing polyisoprene had a number average molecular weight (Mn) of 30,000, an isoprene unit count of 440, and a modification rate of 80%.

Table 8 shows the number average molecular weight (Mn)(×1000) of the polyisoprene obtained in Examples 29 and 30 and Comparative Example 4, the type of additive, the type of conjugated diene compound, the type of modifier, the molar ratio of the additive to lithium (additive (mol)/Li (mol)), the modification rate, and the yield. In Tables 8 and 11, "methoxysilane" indicates N,N-bis(trimethylsilyl)-3-aminopropyldimethylmethoxysilane. The amount (mol) of the additive and the amount (mol) of Li were calculated by the following expressions.

Amount of additive (mol)=amount of additive (ml)× specific gravity (g/ml)/FW (formula weight)

Amount of Li (mol)=amount of initiator solution a1 (ml)×Li concentration in initiator solution a1 (0.17 mol/l)

TABLE 8

|  | Mn (~1000) | Additive | Conjugated diene compound | Modifier | Additive/ lithium (molar ratio) | Modification rate (%) | Yield (g) | Yield (%) |
| --- | --- | --- | --- | --- | --- | --- | --- | --- |
| Example 29 | 32 | BTHFP | Isoprene | Methoxysilane | 0.25 | 90 | 31.0 | 84.3 |
| Example 30 | 5.4 | BTHFP | Isoprene | Methoxysilane | 0.25 | 86 | 30.5 | 78.2 |
| Comparative Example 4 | 30 | THF | Isoprene | Methoxysilane | 46.8 | 68 | 29.8 | 81.0 |

Example 31

3200 mg (0.1 mmol) of the amino group-containing polyisoprene obtained in Example 29 and 2630 mg (10 mmol) of γ-benzyl L-glutamate N-carboxylic anhydride (BLG-NCA) were added to 40 g of dichloromethane. The components were polymerized at 25° C. for 8 hours. A precipitate produced by adding the reaction solution to 1 l of methanol was sufficiently dried at room temperature under reduced pressure to obtain a dry material. A solution prepared by dissolving the dry material in dichloromethane was added to 1 l of hexane to produce a precipitate (reprecipitation treatment). The precipitate was sufficiently dried at room temperature under reduced pressure to obtain 4.9 g of a block copolymer. Table 9 shows the measurement results for the tensile strength and the elongation of the resulting block copolymer.

Example 32

8.0 mg of an antioxidant (2,6-di-tert-butyl-p-cresol) was added to 2.0 g of the block copolymer obtained in Example 31 to obtain a block copolymer according to the present invention. Table 9 shows the measurement results for the tensile strength and the elongation of the resulting block copolymer.

Example 33

2.7 g of a block copolymer was obtained in the same manner as in Example 31, except for using 540 mg (0.1 mmol) of the amino group-containing polyisoprene obtained in Example 30 instead of the amino group-containing polyisoprene obtained in Example 29. Table 9 shows the measurement results for the tensile strength and the elongation of the resulting block copolymer.

Comparative Example 5

5.0 g of a block copolymer was obtained in the same manner as in Example 31, except for using 3400 mg (0.1 mmol) of the amino group-containing polyisoprene obtained in Comparative Example 4 instead of the amino group-containing polyisoprene obtained in Example 29. Table 9 shows the measurement results for the tensile strength and the elongation of the resulting block copolymer.

Table 9 also shows the type of amino group-containing polydiene and the yield of the block copolymer. In Table 9, M/I indicates the molar ratio of the monomer (BLG-NCA) to the initiator (amino group-containing polyisoprene).

TABLE 9

|  | Amino group-containing polydiene | Antioxidant | Properties of block copolymer (M/I = 100) | | | |
| --- | --- | --- | --- | --- | --- | --- |
|  |  |  | Tensile strength (MPa) | Elongation (%) | Yield (g) | Yield (%) |
| Example 31 | Example 29 | Not added | 12.3 | 512 | 4.9 | 84.0 |
| Example 32 | Example 29 | Added | 12.1 | 526 | 4.9 | 84.0 |
| Example 33 | Example 30 | Not added | 20.9 | 12.7 | 2.7 | 85.2 |
| Comparative Example 5 | Comparative Example 4 | Not added | 9.2 | 490 | 5.0 | 82.9 |

Example 34

3200 mg (0.1 mmol) of the amino group-containing polyisoprene obtained in Example 29 and 4025 mg (10 mmol) of N-(4-nitrophenoxycarbonyl)-γ-benzyl L-glutamate (Np-BLG) were added to 40 g of dichloromethane. The components were polymerized at 25° C. for 8 hours. A precipitate produced by adding the reaction solution to 1 l of methanol was sufficiently dried at room temperature under reduced pressure to obtain a dry material. A solution prepared by dissolving the dry material in dichloromethane was added to 1 l of hexane to produce a precipitate (reprecipitation treatment). The precipitate was sufficiently dried at room temperature under reduced pressure to obtain 6.0 g of a block copolymer according to the present invention. Table 10 shows the measurement results for the tensile strength and the elongation of the resulting block copolymer.

Example 35

3.9 g of a block copolymer according to the present invention was obtained in the same manner as in Example 34, except for using 540 mg (0.1 mmol) of the amino group-containing polyisoprene obtained in Example 30 instead of the amino group-containing polyisoprene obtained in Example 29. Table 10 shows the measurement results for the tensile strength and the elongation of the resulting block copolymer.

Comparative Example 6

6.1 g of a block copolymer was obtained in the same manner as in Example 34, except for using 3400 mg (0.1 mmol) of the amino group-containing polyisoprene obtained in Comparative Example 4 instead of the amino group-containing polyisoprene obtained in Example 29. Table 10 shows the measurement results for the tensile strength and the elongation of the resulting block copolymer.

Table 10 also shows the type of amino group-containing polydiene and the yield of the block copolymer. In Table 10, M/I indicates the molar ratio of the monomer (Np-BLG) to the initiator (amino group-containing polyisoprene).

TABLE 10

| | Amino group-containing polydiene | Properties of block copolymer (M/I = 100) | | | |
|---|---|---|---|---|---|
| | | Tensile strength (MPa) | Elongation (%) | Yield (g) | Yield (%) |
| Example 34 | Example 29 | 13.1 | 509 | 6.0 | 83.0 |
| Example 35 | Example 30 | 21.8 | 10.2 | 3.9 | 85.4 |
| Comparative Example 6 | Comparative Example 4 | 8.9 | 501 | 6.1 | 84.4 |

As is clear from the results shown in Tables 9 and 10, a block copolymer that exhibits excellent physical strength can be obtained by producing a block copolymer by the method according to the present invention using an amino group-containing polydiene produced according to the present invention. It was also found that a block copolymer that exhibits excellent elongation can be obtained by utilizing an amino group-containing polydiene having a high molecular weight.

Example 36

A pressure-resistant glass reaction vessel (internal volume: 500 ml) was charged with 331 ml of a dehydrated cyclohexane/heptane mixed solvent, 0.129 ml (1.68 mmol) of isopropanol (IPA, specific gravity: 0.79 g/ml, FW: 60.09), and 1.52 ml (Li (mol): 1.672 mmol) of a sec-butyllithium (s-BuLi) cyclohexane solution (lithium concentration: 1.1 mol/l). A few drops of the initiator solution a1 prepared in Synthesis Example 5 was added to the mixture in a dry nitrogen atmosphere. After confirming that the reaction solution became yellow, 13.8 ml (Li content: 2.40 mmol) of the initiator solution a1 and 36.0 g of dehydrated isoprene were added to the mixture. The mixture was then shaken at 50° C. for 30 minutes to effect a polymerization reaction.

After the addition of 0.11 ml (0.601 mmol) of BTHFP (specific gravity: 1.00 g/ml, FW: 184.27) and 0.98 g of N,N-bis(trimethylsilyl)-3-aminopropyldimethylmethoxysilane (modifier) to the reaction solution, the mixture was shaken at 75° C. or more for 3 hours to effect a modification reaction. The modification reaction was terminated by adding 2 ml of methanol. An operation was performed in the same manner as in Example 29 after completion of the modification reaction. The polymer was then sufficiently dried at 60° C. under vacuum to obtain 29.5 g of polyisoprene (amino group-containing polyisoprene) including a primary amino group at each end. The resulting amino group-containing polyisoprene had a molecular weight distribution (Mw/Mn) of 1.19, a number average molecular weight (Mn) of 32,000, an isoprene unit count of 470, and a modification rate of 91%. The amino group-containing polyisoprene had a 1,4-bond content of 89%, a 1,2-bond content of 0%, and a 3,4-bond content of 10%.

TABLE 11

| | Mn (−1000) | Additive | Conjugated diene compound | Modifier | Additive/ lithium (molar ratio) | Modification rate (%) | Yield (g) | Yield (%) |
|---|---|---|---|---|---|---|---|---|
| Example 36 | 32000 | BTHFP | Isoprene | Methoxysilane | 0.25 | 91 | 29.5 | 80.2 |

Example 37

3200 mg (0.1 mmol) of the amino group-containing polyisoprene obtained in Example 36 and 2630 mg (10 mmol) of γ-benzyl L-glutamate N-carboxylic anhydride (BLG-NCA) were added to 40 g of dichloromethane. The components were polymerized at 25° C. for 8 hours. A precipitate produced by adding the reaction solution to 1 l of methanol was sufficiently dried at room temperature under reduced pressure to obtain a dry material. A solution prepared by dissolving the dry material in dichloromethane was added to 1 l of hexane to produce a precipitate (reprecipitation treatment). The precipitate was sufficiently dried at room temperature under reduced pressure to obtain 5.2 g of a block copolymer. Table 12 shows the measurement results for the tensile strength and the elongation of the resulting block copolymer.

Example 38

3200 mg (0.1 mmol) of the amino group-containing polyisoprene obtained in Example 36 and 4025 mg (10 mmol) of N-(4-nitrophenoxycarbonyl)-γ-benzyl L-glutamate (Np-BLG) were added to 40 g of dichloromethane. The components were polymerized at 25° C. for 8 hours. A precipitate produced by adding the reaction solution to 1 l of methanol was sufficiently dried at room temperature under reduced pressure to obtain a dry material. A solution prepared by dissolving the dry material in dichloromethane was added to 1 l of hexane to produce a precipitate (reprecipitation treatment). The precipitate was sufficiently dried at room temperature under reduced pressure to obtain 6.2 g of a block copolymer. Table 12 shows the measurement results for the tensile strength and the elongation of the resulting block copolymer.

TABLE 12

| | Amino group-containing polydiene | Properties of block copolymer (M/I = 100) | | | |
|---|---|---|---|---|---|
| | | Tensile strength (MPa) | Elongation (%) | Yield (g) | Yield (%) |
| Example 37 | Example 36 | 12.3 | 726 | 5.2 | 86.2 |
| Example 38 | Example 36 | 12.5 | 750 | 6.2 | 85.8 |

As is clear from the results shown in Tables 11 and 12, a polydiene having a 1,4-bond content higher than the 1,2-bond content (double bond in the side chain) is obtained by adding the compound (3) in the step (2). It was also found that a block copolymer that exhibits excellent elongation can be obtained by utilizing the resulting polydiene.

<Other Embodiments>

The present invention is not limited to the above embodiments. For example, the following embodiments (1) to (6) are also included within the scope of the present invention.
(1) In Synthesis Example 5, 1,3-di(1-phenylethenyl)benzene was used as the compound (1), and sec-butyllithium was used as the compound (2). Note that 1,3-bis[(4-methylphenyl)ethenyl]benzene or the like may be used as the compound (1), and n-butyllithium, tert-butyllithium, or the like may be used as the compound (2).
(2) In the examples, BTHFP was used as the additive for a polymerization reaction. Note that the compound (4) such as propylene glycol ethyl propyl ether may be used instead of, or in addition to, BTHFP.
(3) In the examples, isoprene was used as the conjugated diene. Note that butadiene or the like may be used as the conjugated diene.
(4) In the examples, N,N-bis(trimethylsilyl)-3-aminopropyldimethylmethoxysilane was used as the modifier. Note that N,N-bis(trimethylsilyl)aminopropyldimethylmethoxysilane, 3-(2,2,5,5-tetramethyl-1-aza-2,5-disilacyclopentyl)propyldimethylmethoxysilane, or the like may be used as the modifier.
(5) In the examples, BLG-NCA and Np-BLG were used as the compound that is reacted with the amino group-containing polyisoprene to obtain a block copolymer. Note that N-(4-nitrophenoxycarbonyl)-γ-benzyl L-glutamate, N-(4-nitrophenoxycarbonyl)-β-benzyl L-aspartate, N-(4-nitrophenoxycarbonyl)-O-benzyl-L-tyrosine, or the like may also be used.
(6) In the examples, 2,2-di(tetrahydrofuryl)propane (compound D) was used in the step (1) or (2). Note that 2,2-di(tetrahydrofuryl)propane (compound D) may be used in the steps (1) and (2). A polydiene that has a 1,4-bond content higher than the 1,2-bond content (double bond in the side chain) and exhibits excellent elastomer properties is obtained by adding the compound D in the step (2).

Industrial Applicability

The amino group-containing conjugated diene polymer produced by the method for producing an amino group-containing conjugated diene polymer according to the present invention enables an A-B-A block copolymer that includes the amino acid block (A) and the conjugated diene block (B), which may be used as a medical material and the like, to be safely produced in high yield without using phosgene.

The invention claimed is:

1. A method for producing an amino group-containing conjugated diene polymer comprising polymerizing a conjugated diene compound in the presence of a reaction product (a) of a compound shown by the following general formula (1) and a compound shown by the following general formula: RLi, in which R represents an alkyl group having 1 to 16 carbon atoms or an aryl group having 6 to 20 carbon atoms, to obtain a conjugated diene polymer, and reacting the conjugated diene polymer with a compound (b) shown by the following general formula (2) or (3),

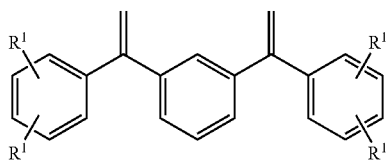

(1)

wherein $R^1$ represents a hydrogen atom or an alkyl group having 1 to 16 carbon atoms,

(2)

wherein $R^2$ and $R^3$ individually represent a hydrogen atom, an aralkyl group having 7 to 20 carbon atoms, or an organosiloxy group, and $R^4$ represents a hydrogen atom, a trialkylsilyl group having 3 to 18 carbon atoms, an alkyl group having 1 to 20 carbon atoms, an aryl group having 6 to 20 carbon atoms, an aralkyl group having 7 to 20 carbon atoms, or an organosiloxy group,

(3)

wherein $R^5$ and $R^6$ individually represent an alkyl group having 1 to 20 carbon atoms, an aryl group having 6 to 20 carbon atoms, an aralkyl group having 7 to 20 carbon atoms, or an organosiloxy group, X represents an alkoxy group having 1 to 20 carbon atoms, an allyloxy group having 6 to 20 carbon atoms, or a halogen atom, $R^7$ represents a methylene group, an alkylene group having 2 to 20 carbon atoms, or an alkylidene group having 2 to 20 carbon atoms, and $R^8$ and $R^9$ individually represent a trialkylsilyl group having 3 to 18 carbon atoms when $R^8$ and $R^9$ do not bond to each other, or bond to each other to form a cyclic structure that is formed by the nitrogen atom that is bonded to $R^8$ and $R^9$, two silicon atoms, and 1 to 10 carbon atoms.

2. The method for producing an amino group-containing conjugated diene polymer according to claim 1, wherein the conjugated diene compound is isoprene or butadiene.

3. The method for producing an amino group-containing conjugated diene polymer according to claim 2, wherein at least one of the two steps is performed in the presence of at least one of a compound shown by the following general formula (4) and a compound shown by the following general formula (5),

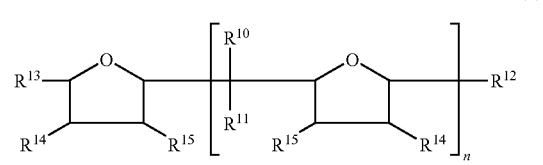

(4)

wherein $R^{10}$, $R^{11}$, $R^{12}$, $R^{13}$, $R^{14}$, and $R^{15}$ individually represent a hydrogen atom, an alkyl group having 1 to 20 carbon atoms, or an aryl group having 6 to 20 carbon atoms, and n represents an integer from 1 to 5,

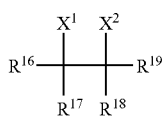
(5)

wherein $R^{16}$, $R^{17}$, $R^{18}$, and $R^{19}$ individually represent a hydrogen atom, an alkyl group having 1 to 20 carbon atoms, or an aryl group having 6 to 20 carbon atoms, and $X^1$ and $X^2$ individually represent an alkoxy group having 1 to 20 carbon atoms, an allyloxy group having 6 to 20 carbon atoms, a sulfur atom-containing functional group, or a phosphorus atom-containing functional group.

4. A method for producing a block copolymer comprising copolymerizing an amino group-containing conjugated diene polymer produced by the method for producing an amino group-containing conjugated diene polymer according to claim 3 and an amino acid derivative having a carbamate structure to obtain an A-B-A block copolymer that includes an amino acid block (A) and a conjugated diene block (B).

5. A method for producing a block copolymer comprising copolymerizing an amino group-containing conjugated diene polymer produced by the method for producing an amino group-containing conjugated diene polymer according claim 2 and an amino acid derivative having a carbamate structure to obtain an A-B-A block copolymer that includes an amino acid block (A) and a conjugated diene block (B).

6. The method for producing an amino group-containing conjugated diene polymer according to claim 1, wherein at least one of the two steps is performed in the presence of at least one of a compound shown by the following general formula (4) and a compound shown by the following general formula (5),

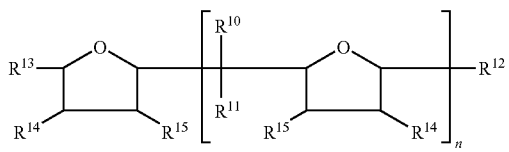
(4)

wherein $R^{10}$, $R^{11}$, $R^{12}$, $R^{13}$, $R^{14}$, and $R^{15}$ individually represent a hydrogen atom, an alkyl group having 1 to 20 carbon atoms, or an aryl group having 6 to 20 carbon atoms, and n represents an integer from 1 to 5,

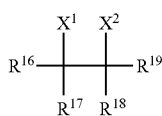
(5)

wherein $R^{16}$, $R^{17}$, $R^{18}$, and $R^{19}$ individually represent a hydrogen atom, an alkyl group having 1 to 20 carbon atoms, or an aryl group having 6 to 20 carbon atoms, and $X^1$ and $X^2$ individually represent an alkoxy group having 1 to 20 carbon atoms, an allyloxy group having 6 to 20 carbon atoms, a sulfur atom-containing functional group, or a phosphorus atom-containing functional group.

7. A method for producing a block copolymer comprising copolymerizing an amino group-containing conjugated diene polymer produced by the method for producing an amino group-containing conjugated diene polymer according to claim 6 and an amino acid derivative having a carbamate structure to obtain an A-B-A block copolymer that includes an amino acid block (A) and a conjugated diene block (B).

8. A method for producing a block copolymer comprising copolymerizing an amino group-containing conjugated diene polymer produced by the method for producing an amino group-containing conjugated diene polymer according to claim 1 and an amino acid derivative having a carbamate structure to obtain an A-B-A block copolymer that includes an amino acid block (A) and a conjugated diene block (B).

9. The method for producing a block copolymer according to claim 8, wherein the amino acid derivative is a compound (c) shown by any of the following general formulas (6) to (8),

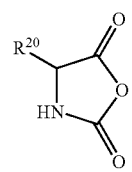
(6)

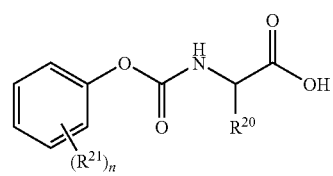
(7)

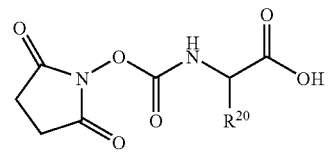
(8)

where, in the formulas (6) to (8): $R^{20}$ represents a hydrogen atom or an organic group having one or more carbon atoms, in the foremula (7): $R^{21}$ represents a hydrogen atom or an electron-attracting group, and n represents an integer from 1 to 5, provided that a plurality of $R^{21}$ may be the same or different when n is an integer equal to or larger than 2.

10. The method for producing a block copolymer according to claim 9, wherein $R^{20}$ in the general formulas (6) to (8) is a group having an ester structure.

11. The method for producing a block copolymer according to claim 10, wherein $R^{20}$ in the general formulas (6) to (8) is a group shown by the following general formula (9),

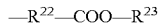
$-R^{22}-COO-R^{23}$ (9)

wherein $R^{22}$ represents a methylene group or an alkylene group having 2 to 10 carbon atoms, and $R^{23}$ represents an aromatic ring-containing hydrocarbon group having 6 to 20 carbon atoms.

12. The method for producing a block copolymer according to claim 11, wherein $R^{21}$ in the general formula (7) is an electron-attracting group.

13. The method for producing a block copolymer according to claim 10, wherein $R^{21}$ in the general formula (7) is an electron-attracting group.

14. The method for producing a block copolymer according to claim 9, wherein $R^{20}$ in the general formulas (6) to (8) is a group shown by the following general formula (9),

  (9)

wherein $R^{22}$ represents a methylene group or an alkylene group having 2 to 10 carbon atoms, and $R^{23}$ represents an aromatic ring-containing hydrocarbon group having 6 to 20 carbon atoms.

15. The method for producing a block copolymer according to claim 14, wherein $R^{21}$ in the general formula (7) is an electron-attracting group.

16. The method for producing a block copolymer according to claim 9, wherein $R^{21}$ in the general formula (7) is an electron-attracting group.

17. The method for producing a block copolymer according to claim 9, wherein $R^{21}$ in the general formula (7) is a nitro group or a halogen atom at the para position.

18. An amino group-containing conjugated diene polymer shown by the following general formula (10),

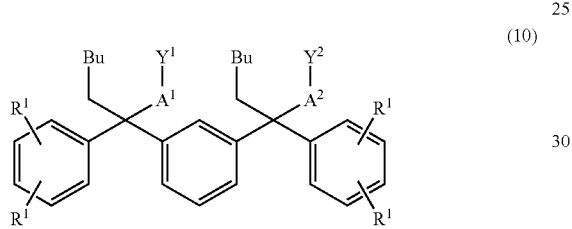  (10)

wherein $R^1$ represents a hydrogen atom or an alkyl group having 1 to 16 carbon atoms, Bu represents a butyl group, $A^1$ and $A^2$ represent a polydiene polymer chain that includes a conjugated diene compound as a monomer unit, and $Y^1$ and $Y^2$ represent hydrogen or a functional group shown by the following general formula (11), provided that at least one of $Y^1$ and $Y^2$ is a functional group shown by the general formula (11),

  (11)

wherein $R^5$ and $R^6$ represent an alkyl group having 1 to 20 carbon atoms, an aryl group having 6 to 20 carbon atoms, an aralkyl group having 7 to 20 carbon atoms, or an organosiloxy group, and $R^7$ represents a methylene group, an alkylene group having 2 to 20 carbon atoms, or an alkylidene group having 2 to 20 carbon atoms.

19. An A-B-A block copolymer comprising an amino acid block (A) and a conjugated diene block (B), the block copolymer being obtained by copolymerizing the amino group-containing conjugated diene polymer according to claim 18 and a compound shown by any of the following general formulas (6) to (8),

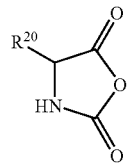  (6)

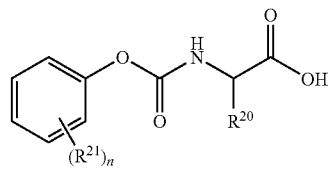  (7)

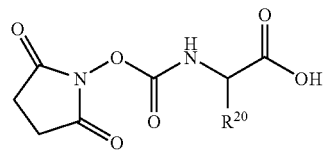  (8)

where, in the formulas (6) to (8): $R^{20}$ represents a hydrogen atom or an organic group having one or more carbon atoms, in the formula (7): $R^{21}$ represents a hydrogen atom or an electron-attracting group, and n represents an integer from 1 to 5, provided that a plurality of $R^{21}$ may be the same or different when n is an integer equal to or larger than 2.

20. The block copolymer according to claim 19, the block copolymer being shown by the following general formula (12),

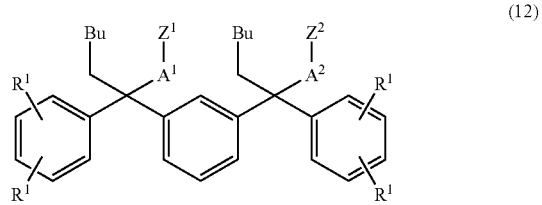  (12)

wherein $R^1$ represents a hydrogen atom or an alkyl group having 1 to 16 carbon atoms, $A^1$ and $A^2$ represent a polydiene polymer chain that includes a conjugated diene compound as a monomer unit, Bu represents a butyl group, and $Z^1$ and $Z^2$ represent hydrogen, a group derived from a functional group shown by the general formula (11), or a polyamino acid polymer chain shown by the following general formula (13), provided that at least one of $Z^1$ and $Z^2$ is a polyamino acid polymer chain shown by the general formula (13),

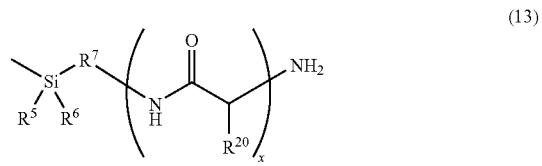  (13)

wherein $R^5$ and $R^6$ individually represent an alkyl group having 1 to 20 carbon atoms, an aryl group having 6 to 20 carbon atoms, an aralkyl group having 7 to 20 carbon atoms, or an organosiloxy group, $R^7$ represents a methylene group, an alkylene group having 2 to 20 carbon atoms, or an alkylidene group having 2 to 20 carbon atoms, $R^{20}$ represents a hydrogen atom or a monovalent organic group having one or more carbon atoms, and x represents an integer from 1 to 500.

* * * * *